(12) United States Patent
Sheha et al.

(10) Patent No.: US 8,014,939 B2
(45) Date of Patent: Sep. 6, 2011

(54) POINT OF INTEREST SPATIAL RATING SEARCH

(75) Inventors: Michael A. Sheha, Laguna Niguel, CA (US); Angie Sheha, Laguna Niguel, CA (US); Stephen Petilli, Laguna Niguel, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 930 days.

(21) Appl. No.: 11/947,719

(22) Filed: Nov. 29, 2007

(65) Prior Publication Data

US 2008/0076451 A1    Mar. 27, 2008

Related U.S. Application Data

(62) Division of application No. 11/450,171, filed on Jun. 8, 2006, now Pat. No. 7,321,826, which is a division of application No. 10/222,450, filed on Aug. 16, 2002, now Pat. No. 7,082,365.

(60) Provisional application No. 60/313,010, filed on Aug. 16, 2001.

(51) Int. Cl.
*G01C 21/00* (2006.01)
(52) U.S. Cl. ........................... 701/200; 701/211
(58) Field of Classification Search .......... 701/200–202, 701/209–211, 213–215; 340/988, 995.1, 340/995.19; 455/456.1, 456.2, 457
See application file for complete search history.

(56) References Cited

U.S. PATENT DOCUMENTS

| | | |
|---|---|---|
| 4,939,662 A | 7/1990 | Nimura et al. |
| 5,389,934 A | 2/1995 | Kass |
| 5,557,254 A | 9/1996 | Johnson |
| 5,636,122 A | 6/1997 | Shah |
| 5,684,951 A | 11/1997 | Goldman |
| 5,689,269 A | 11/1997 | Norris |
| 5,689,809 A | 11/1997 | Grube |
| 5,727,057 A | 3/1998 | Emery et al. |
| 5,774,824 A | 6/1998 | Streit |
| 5,801,700 A | 9/1998 | Ferguson |
| 5,802,492 A | 9/1998 | DeLorme et al. |
| 5,904,727 A | 5/1999 | Prabhakaran |
| 5,926,118 A | 7/1999 | Hayashida |

(Continued)

FOREIGN PATENT DOCUMENTS
GB     2305568     4/1997
(Continued)

*Primary Examiner* — Yonel Beaulieu
(74) *Attorney, Agent, or Firm* — William H. Bollman

(57) ABSTRACT

The present invention is directed to a system and method for searching and retrieving location information associated with one or more points of interests, whereby the search criteria can be dependent upon the location of a point of interest with respect to the real-time position of the user, and any preferences or search restrictions selected by the user, such as rating information about the point of interest. Upon selecting a point of interest from the search result, the user is then given further information regarding the selected point of interest, including but not limited to directions for traveling to the point of interest. Additionally, the present invention can provide to the user a proximity notification once the user is within a certain distance from the point interest. Finally, while at a point of interest, the user can provide to the system information regarding the point of interest, such as rating of the food of a restaurant, without having to specifically identify the point of interest as the system can self-identify the point of interest by using the position information of the user.

40 Claims, 22 Drawing Sheets

U.S. PATENT DOCUMENTS

| | | | |
|---|---|---|---|
| 5,944,768 A | 8/1999 | Ito | |
| 5,948,040 A | 9/1999 | DeLorme et al. | |
| 5,982,301 A | 11/1999 | Ohta | |
| 6,049,718 A | 4/2000 | Stewart | |
| 6,084,951 A | 7/2000 | Smith | |
| 6,091,957 A | 7/2000 | Larkins | |
| 6,138,003 A | 10/2000 | Kingdon | |
| 6,169,516 B1 | 1/2001 | Watanabe | |
| 6,182,006 B1 | 1/2001 | Meek | |
| 6,182,227 B1 | 1/2001 | Blair | |
| 6,185,426 B1 | 2/2001 | Alperovich | |
| 6,188,957 B1 | 2/2001 | Bechtolsheim | |
| 6,204,844 B1 | 3/2001 | Fumarolo | |
| 6,208,934 B1 | 3/2001 | Bechtolsheim et al. | |
| 6,226,367 B1 | 5/2001 | Smith | |
| 6,317,684 B1 | 11/2001 | Roeseler | |
| 6,321,158 B1 | 11/2001 | DeLorme et al. | |
| 6,331,825 B1 | 12/2001 | Ladner | |
| 6,353,664 B1 | 3/2002 | Cannon | |
| 6,366,782 B1 | 4/2002 | Fumarolo | |
| 6,366,856 B1 | 4/2002 | Johnson | |
| 6,377,210 B1 | 4/2002 | Moore | |
| 6,415,224 B1 | 7/2002 | Wako | |
| 6,441,752 B1 | 8/2002 | Fomukong | |
| 6,442,391 B1 | 8/2002 | Johansson | |
| 6,459,782 B1 | 10/2002 | Bedrosian | |
| 6,466,788 B1 | 10/2002 | Carlsson | |
| 6,529,143 B2 | 3/2003 | Mikkola et al. | |
| 6,539,080 B1 | 3/2003 | Bruce | |
| 6,563,824 B1 | 5/2003 | Bhatia | |
| 6,571,174 B2 | 5/2003 | Rigazio | |
| 6,621,423 B1 | 9/2003 | Cooper | |
| 6,640,185 B2 | 10/2003 | Yokota | |
| 6,643,516 B1 | 11/2003 | Stewart | |
| 6,665,715 B1 | 12/2003 | Houri | |
| 6,674,849 B1 | 1/2004 | Froeberg | |
| 6,766,174 B1 | 7/2004 | Kenyon | |
| 6,775,371 B2 | 8/2004 | Elsey | |
| 6,801,850 B1 | 10/2004 | Wolfson | |
| 6,816,782 B1 | 11/2004 | Walters | |
| 6,819,919 B1 | 11/2004 | Tanaka | |
| 6,829,532 B2 | 12/2004 | Obradovich | |
| 6,839,630 B2 | 1/2005 | Sakamoto | |
| 6,842,696 B2 | 1/2005 | Silvester | |
| 6,885,874 B2 | 4/2005 | Grube | |
| 6,895,329 B1 | 5/2005 | Wolfson | |
| 6,898,516 B2 * | 5/2005 | Pechatnikov et al. | 701/202 |
| 6,910,818 B2 | 6/2005 | McLoone | |
| 6,925,603 B1 | 8/2005 | Naito | |
| 6,934,705 B2 | 8/2005 | Tu et al. | |
| 6,944,535 B2 | 9/2005 | Iwata | |
| 6,970,871 B1 | 11/2005 | Rayburn | |
| 7,079,945 B1 | 7/2006 | Kaplan | |
| 7,082,365 B2 | 7/2006 | Sheha et al. | |
| 7,089,110 B2 * | 8/2006 | Pechatnikov et al. | 701/210 |
| 7,142,163 B2 | 11/2006 | Fukano et al. | |
| 7,142,205 B2 | 11/2006 | Chithambaram | |
| 7,167,187 B2 | 1/2007 | Scott | |
| 7,202,801 B2 | 4/2007 | Chou | |
| 7,266,376 B2 | 9/2007 | Nakagawa | |
| 7,565,157 B1 * | 7/2009 | Ortega et al. | 455/456.2 |
| 7,653,544 B2 | 1/2010 | Bradley | |
| 7,774,003 B1 * | 8/2010 | Ortega et al. | 455/456.2 |
| 2002/0032036 A1 | 3/2002 | Nakajima | |
| 2002/0052786 A1 | 5/2002 | Kim et al. | |
| 2002/0059201 A1 | 5/2002 | Work | |
| 2002/0069239 A1 | 6/2002 | Katada | |
| 2002/0086683 A1 | 7/2002 | Kohar | |
| 2002/0169539 A1 | 11/2002 | Menard | |
| 2003/0014487 A1 | 1/2003 | Iwakawa | |
| 2003/0036949 A1 | 2/2003 | Kaddeche | |
| 2003/0061211 A1 | 3/2003 | Shultz et al. | |
| 2004/0008225 A1 | 1/2004 | Campbell | |
| 2004/0204829 A1 | 10/2004 | Endo | |
| 2004/0229595 A1 | 11/2004 | Laursen | |
| 2005/0062636 A1 | 3/2005 | Conway | |
| 2005/0219067 A1 | 10/2005 | Chung | |
| 2005/0242168 A1 | 11/2005 | Tesavis | |
| 2007/0004461 A1 | 1/2007 | Bathina | |
| 2007/0208687 A1 | 9/2007 | O'Connor | |
| 2008/0077324 A1 | 3/2008 | Hatano | |
| 2008/0129475 A1 | 6/2008 | Breed | |
| 2008/0288166 A1 | 11/2008 | Onishi | |
| 2010/0268848 A1 | 10/2010 | Maurya | |

FOREIGN PATENT DOCUMENTS

| | | |
|---|---|---|
| WO | WO-96/36930 | 11/1996 |

* cited by examiner

[Lat.,Lon.,Alt.],[POI Name],[Category$_1$[Rating],Category$_2$[Rating],...,Category$_N$[Rating]]; (17.1)

Category → Sub Category$_1$ → Sub Category$_2$ → ..... → Sub Category$_N$ (17.2)

Sub Category$_X$ → 'Sub Category → 'Brand or Chain' (17.3)

Restaurants → "Italian Cuisine" (17.4)

Restaurants → Fast Food → Children Food → McDonalds (17.5)

POINT OF INTEREST SPATIAL RATING SEARCH

CROSS-REFERENCE TO RELATED APPLICATIONS

This application is a division of application Ser. No. 11/450,171 filed on Jun. 8, 2006, (now U.S. Pat. No. 7,321,826); which is a division of application Ser. No. 10/222,450 filed on Aug. 16, 2002, (now U.S. Pat. No. 7,082,365); which in turn claims the benefit under 35 USC 119(e) of U.S. provisional patent application Ser. No. 60/313,010 filed Aug. 16, 2001, which applications are specifically incorporated in their entirety by reference herein.

BACKGROUND

1. Field of Invention

The present invention relates to a system and method for providing the capability for spatial searches used to find and rate points of interest (POI) information and items associated with various POIs, such as for finding the best restaurant, or for finding a specific book in a highly rated bookstore in the surrounding area.

2. Description of the Related Art

Current rating search systems are based on static non-spatial searches that provide users with the ability to select only categorical searches that deal with specific inputted preferences. For instance, typical Internet-based rating systems allow users to search regions for restaurants based on name, cost, and/or area. These search systems can provide information that is based on only broad spatial inputted information, such as a given city or zip code. Also, prior art search systems are limited in the type of POIs they can search against. Typically users can rate and search, using standard personal computers with static Internet connections, only restaurants.

Additionally, map programs are well known in the art, which provide a graphical representation of a set of geographical coordinates, such as streets and highways. These map programs can also be purchased with geocoded POI information, such as restaurants and movie theaters. Current map programs provide search capability for finding the desired POI information nearest to a given inputted geographical coordinate information, such as an address of a house.

Navigational devices are typically defined as devices that provide a unit's local position and a way of planning a course around the unit's local position, sometimes to a remote position, as in the case of an in-vehicle navigational device, also well known in the art. Typically, an in-vehicle navigation device consists of a display screen, processing unit, storage unit, and user input mechanism. The storage system typically contains, for example, maps and travel information used for navigational purposes. Travel information may include POIs such as local restaurants, theaters, municipality locations, and the like.

Determining one's position using a navigational device has typically been accomplished by integrating or connecting a Global Positioning System (GPS) device with various types of computing devices, such as a personal computer or handheld GPS unit. New positioning determination systems include network-assisted wireless location systems, such as Time-of-Arrival (TOA), and network-assisted GPS systems for determining the navigational device's position. The unit's location is then displayed on the device and is available for various applications, such as in the case of a commuter seeking the shortest route to a location in a specific area or a user wanting to find the nearest gas station.

A need exists for users to have the ability to rate and conduct a spatial search for all POI information, such as golf courses, restaurants, home addresses, hotels, hair salons, bowling allies, etc., and items associates with various POIs based on the users' current position information and utilizing various search metric queries. These search metric queries can include, for example, searching based on one's own personally highest-rated choices, searching for ratings compiled by various other users, such as people with a common interest about a particular POI, or searching based on an aggregate average user rating response. Thus, there is a need for providing these spatial searches and rating capabilities based on various metrics, all of which is configurable by the user. These spatial searches and ratings are based on the knowledge of the user's position information and can provide the means to navigate to such desired POI's location, since the user may require the best travel route possible from the user's current position. Routes can be calculated using real-time traffic information and the highest speed-rated street or highway with the fewest stops to determine the shortest possible travel route.

SUMMARY OF THE INVENTION

It is an object of the present invention to provide a plurality of methods for searching various POIs within a given search zone, such as a radial search, boxed boundary search, or a zip code or city search, based on position information from a navigational device. The search method incorporates a categorical rating metrics search engine for providing the searcher with an indexed response of the highest rated POI information within the spatial search zone based on the user's search criteria. The POI ratings are based on various quantitative factors or user's experiences, such as decor, service, food, location, etc., or based on various pricing structures, such as the estimated cost of the POI service, such as an average restaurant meal price or typical amusement park gate fee.

It is another object of the present invention to provide a method for allowing a user to rate POIs based on various quality factors, such as decor, service, food, price, location, etc. In one embodiment, a user can rate a POI based on a simple rating metric, such as a scale of 1-40, where 1 represents the worst overall user experience and 40 represents the best overall user experience. The user can also drill down into more specific rating categories that represent more granularity of the overall POI rating, for example the quality of service or décor. Additionally, not all POIs preferably incorporate the same rating metrics. For example, a food establishment rating metric might include average price per entrée or general price categories, such as inexpensive, moderate, very expensive, etc., while for a business bank such a field is inappropriate.

It is another object of the invention to provide a method to compensate for various POIs that have not been rated by any or enough users, such that the results of a search for a particular POI would not be as reliable as compared to a large number of users having rated a single POI. In one embodiment, this compensation is provided, when necessary, by assigning greater rating value to known professional critics' reviews, or the like, as compared to that of an individual user's reviews, such that the search results for a given POI are valid for this initial special case until sufficient individual users have rated a particular POI to average out any individual user's bias of a particular POI contrary to the mean users' rating values.

It is another object of the present invention to provide a plurality of methods for searching various items associated with various POIs within a given search zone, such as a radial search, boxed boundary search, or a zip code or city search, based on position information. The search method can incorporate various rating search methods, such as a categorical rating metrics search for providing the searcher with an indexed response of the highest rated POIs within a given area that are associated with a specific searched item. In one embodiment, a user wanting to find the highest rated stores (i.e., POIs) in a given area that carry a particular item that he or she wishes to purchase or view may want the search to be based on his or her current position information, such as by utilizing a navigational device or manually inputted address information, and possibly determine if the specific rated stores have the item in stock and how many are remaining. Examples of such searches may include a search for a theater playing a desired movie, a computer store selling a desired software application, or a store selling video game consoles within a given price range, This search can be accomplished utilizing any computing device, such as a standard personal computer, and it is not limited to navigational devices, such that a user could specify a general area or location using various methods, such as selecting an area on a map or entering various address information fields.

It is yet another object of the invention to search for POI ratings by location or to notify a user about a POI rating based on his or her location without having to initiate a detailed search to find various POIs using a navigational device. In one embodiment, users can have the mobile device notify them that there are ratings about a particular POI based on their proximity to the POI. For instance, if a user is in or near a particular restaurant, the system can notify the user that one or more ratings exist for that restaurant so that the user can view such ratings. This allows users to read various ratings about a POI without having to initiate a search for the POI, which can be cumbersome and difficult on any device, especially a mobile device.

It is another object of the invention to allow a means to identify a user through an authentication and authorization procedure, in order to, for instance, ensure that a user is correctly identified as authorized to submit ratings to the overall system or allowed to access the rating system search engine for a particular type of search field or within a given spatial zone.

It is another object of the invention for the user to have access to the online networked rating search engine, such as through a wireless, wired, infrared, or optical connection acting as the physical layer for the cases where a network connection is required or appropriate.

It is another object of the invention to provide a means for the user to obtain real-time search queries from the online networked rating search engine on various devices, such as using a networked navigational device, or by caching POI rating information for a given region, such as a city, county, state, or nation, when using a mobile device without connectivity to the online networked server. Additionally, rating information that the user compiled while the device was disconnected from the online networked rating search engine can be uploaded to the online networked rating search engine once the device is connected to the Internet, such as by using a technique called hot synching, where a device interfaces to a computer with an Internet connection, or by connecting the device to a dialup modem with an established Internet connection, or a similar method as commonly known to a person in the art.

It is another object of the invention to enable the request and delivery of such rating search queries and responses via various local device or network-enabled server means, such as by using a numeric, alphanumeric, or speech-enabled interface, a graphical user interface (GUI) display, or a software Application Program Interface (API), or the like. Additionally, the search results can be delivered over a network connection from the online networked rating search engine to the client by means of a Voice-Over-IP (VoIP) connection (e.g., H.323 protocols) using a server-sided Text-To-Speech (TTS) implementation, or by using a streaming audio format to the client. The information can also be delivered over different physical layers, such as an additional RF connection using an AM (Amplitude Modulated) or FM (Frequency Modulated) standard format for transmitting the appropriate data.

It is still another object of the invention to provide a method for enabling users that are at or near a specific POI to rate only that POI, taking into consideration the user's position information provided by various means, such as by a navigational device. For example, this precludes users from blindly rating all POIs that are considered franchises or chains in a given region, or nationally, if they had a particular experience at a local POI that may not apply to other POIs of the same franchises or chain.

It is still another object of the invention to provide a method for searching, using various search methods, an entire chain or franchise based on various quality factors, such as store locations, and enabling the user to check if a POI associated with the chain or franchise is within a given area. Additionally, directions can be provided to the desired POI based on the user's position information. In one embodiment, this search allows users to search specifically for a chain or franchise, which may offer better nationwide return policies, or user satisfaction, for example, and this search can also indicate the store branch near a given location. Users can also obtain real-time driving directions from their current position to the desired store with the use of a navigational device. In another embodiment, a user may ask, "Find me the best rated electronic store chain that has stores in New Jersey and California." This would be useful for a user living in New Jersey who is going to buy a TV, but knows he or she will be living in California in a few months and may want to return it or have it repaired in California if it breaks.

It is still another object of the invention to enable users to update their previously submitted ratings after reconsidering his or her original submission. In one embodiment, the rating re-submission may not require the user to be located within a nearby POI, and thus can be done from anywhere.

It is still another object of the invention to provide various rating searches, such as 1). Best Categorical Rating Search, 2). Aggregate Average Population Rating Search, 3). Personal—Favorites Rating Search, 4). Similar User-Rating Search.

It is still another object of the invention to provide a method that allows for the storage and easy retrieval of various POIs, reviews, and other additional information about various POIs, in a user's preferences, such as the 'Personal—Favorites Rating Search' provides. Additionally, maps of varying resolution and size can be displayed of such stored POIs.

It is still another object of the invention to provide geo-triggered notifications to a navigational device based on the stored POI's position information and the navigational device's position. In one embodiment, a user on travel may want to plan the trip by using various rating searches or address information to identify various POIs, such as a historical landmark, famous restaurant, etc. Once these various POIs are stored into the system, locally, on the navigational device, or on the online networked system server, the system would apprise or alert the user when he or she is near these various stored POIs, such as within the POI's city of location or a block away from the POI's location, based on the system's or user's pre-defined notification boundary or range settings.

It is still another object of the invention to provide geo-triggered notifications to POIs based on the user's real-time position information. In one embodiment, users that store favorite POIs can receive special coupons from the specific POI based on the user's location relative to the POI and the triggering area set by the POI. The users can then opt-in at any time to receive such geo-triggered coupons.

It is yet still another object of the invention to provide a searched indexed POI response that can provide, as in the form of a link to another display or within the same display, a detailed user review of a specific POI, thus allowing users to read what they or other users have written about a specific POI. Additionally, this also provides the ability to read a review from a professional critic known in the specific field of the POI, such as a food critic rating a restaurant.

It is yet still another object of the invention to allow users to store personal note information about a specific geographical POI, or chain or franchise of POIs, for their own review anytime. In one embodiment, after choosing a desired restaurant POI in a given location, users may want to recall their favorite entrée that they had ordered when they previously visited the restaurant POI, and users may want to recall, for example, not to get the spaghetti with white sauce, but with red sauce, and to add seafood to the entrée. Additionally, for example, a user may customize specific notes about specific destination POIs prior to actually being located in the region of the specific POIs. The personalized POI note information can be stored locally on the navigational device, or uploaded to the online networked rating search engine, and later accessed, which in one embodiment, can all be done utilizing authorization and authentication procedures. This custom note creation and its access can be accomplished via any computing device, such as a personal computer, and it is not limited to navigational devices.

It is yet still another object of the invention to provide users directions from their current location to a desired POI that was provided from a search query. These directions can be provided in various formats, such as text, voice (i.e., speech directions), mapping of varying resolutions, etc., and may encompass additional information that may add to the accuracy of the provided direction information. In one embodiment, a user in a vehicle may require routable driving directions from their present location to the desired POI which incorporates various additional information that will aid in the accuracy and efficiency of the direction information, such as real-time traffic information and appropriate highway ramp or street turn restrictions that can be time dependent (i.e., right turn only from 7 AM to 5 PM). As an additional example, directions for a hiker seeking a POI, such as a campground, might require a routable hiking trail or directional information, such as the ability to provide azimuth, elevation, altitude, altitude difference, line-of-sight (LOS) distance, and curved earth LOS distance measurements, between the user and the destination POI, which can be delivered to the user in various formats, such as text, voice (i.e., speech directions), mapping of varying resolutions, etc.

It is yet still another object of the invention to provide a method of indexing desired POIs based on their location relative to a pre-defined route and the user's current position information provided by a navigational device, such that POIs that are closer to the pre-defined route are given a higher priority index than POIs that are off the current pre-defined route and would require a considerable detour from the pre-defined route, or near the pre-defined route, but that have been passed by the navigational device. In one embodiment, a user that has defined a route from point A to point B and is navigating on the predefined route would want to find the highest rated restaurant in the nearby area for dinner within an area between point A and point B. Using a variety of aforementioned search methods, the search may return 4 restaurants that all have equal ratings and are all approximately the same driving distance from the navigational device's current position. However, only one restaurant's position is directly ahead on the pre-defined route of the navigational device, while 1 of the other 3 restaurants is behind the navigational device on the pre-defined route, and the other 2 are off the route on either side of the navigational device. Thus, the restaurant that is located nearest to the pre-defined route, closest to the navigational device, and on a portion of the pre-defined route which has not already been traversed and requires minimal or no deviation from the pre-defined route will have the highest indexed response, and is displayed in a rating window relative to the other restaurant ratings. In another embodiment, the system can provide the total off-route driving time necessary to reach the POI and then back to the pre-defined route for each indexed POI.

It is yet still another object of the present invention to provide a method for providing a plurality of stopover POIs when defining a route from a START position to an END position. The search method can incorporate various search methods, such as the 'Personal—Favorites Rating Search' for providing the searcher with an indexed response of various POIs for use in planning a route. In one embodiment, a user will search for various POIs based on a variety of preferences that the user wishes to incorporate in the search parameters. The searcher would then add a single or plurality of POIs to be included in the route to be calculated. The route engine would then calculate the route based on various factors, such as traffic information, speed limits, turn restrictions, etc., and user preferences, such as preferred streets or highways to use or avoid, while incorporation the selected POIs as stopover points during the route. In one embodiment, a user on travel wishing to visit an amusement park would search for a selected amusement park by name, and then add the POI to the preferred route and specify that the START and END positions are the same, the user's home address. The system would then calculate the route to and from the amusement park. Additionally, the user can add a plurality of POIs to be used in the route calculation and have the START and END points at different locations. Also, the user can identify which POIs they would like to visit in any specific order, or the system can determine the optimal order based on the location of the various identified POIs and the START and END positions for the route calculation.

It is yet still another object of the invention to provide these aforementioned capabilities on various devices, such as personal/workstation/tablet computing devices, personal digital assistance (PDA) devices, telephone (both wired and wireless) devices, or various devices with Voice-Over-IP (VoIP) capability and including any VoIP derivatives, such as Voice-Over-DSL (VoDSL), in which all devices have access to various forms of position information, such as GPS or network-based positioning techniques, such as Time-Of-Arrival (TOA) implementations.

According to one embodiment of the present invention, there is provided a system of obtaining various forms of position information, such as with a navigational device, and a method of searching POIs or items associated with POIs based on a rating scale, in order to find the most preferred POI or item, and using various search criteria selected by the user, software or hardware application, or the like. This method allows users to search for desirable POIs using various spatial search methods, such as the 'Best Categorical Rating Search', 'Aggregate Average Population Rating Search', 'Personal—Favorites Rating Search', or 'Similar User-Rating Search'.

In one embodiment, the 'Best Categorical Rating Search' is based on the selection of a specific category or sub-category according to a user's set of preferences, such as searching for nearby Italian food with an overall rating of 32 or better (given a total scale of 40). In another embodiment, the 'Personal—Favorites Rating Search' allows users to compile and store their own personal ratings for various POIs in various user defined formats, such as personalized folders, which can be stored locally on the mobile device and/or remotely on the online networked rating search engine server. This enables a user to use his or her POI rating information both locally and remotely, such as when on travel, as the subset of POIs on which to perform a search, or as a ranking system that affects the indexing of displayed search results. In another embodiment, a user traveling in an unfamiliar area may want to use his or her preferred ratings when searching a specific area for a favorite restaurant chain or franchise. Should an exact match not be found, the user may then search the unfamiliar area for the nearest fast food restaurant that is similar to the user's favorite fast food restaurants in the user's local familiar area that are the highest-rated by the user. In another embodiment, the 'Personal—Favorites Rating Search' allows users to use their core set of POIs as a subset from which to search for the nearest POI, such that POIs that the users have not previously rated are not included in the search. Both POI sets, the user's core set of POIs as well as the complete set of POIs, can be searched upon, and when the search results are displayed, the POIs can be indexed by two methods. The search results can be indexed with more weight on the user's own ratings, such as a displayed result that ranks first a POI that the user has rated 95% in the display index and the aggregate user population rated 90%, and ranks second a POI that the aggregate user population rated 98% and the user rated less than 95% or not at all. Conversely, the search results can also be indexed with more weight on the aggregate user population rating, rather than the user's own personal ratings as in the previous example, so that the POIs' indices in the previous example are reversed.

The 'Aggregate Average Population Rating Search' consists of the average user ratings compiled for various top-level categorical searches. In one embodiment, the average user ratings for the best restaurant in a given area uses the base of the global community of users all having rated various POIs within the overall category and area, and can be used to search for the best-rated restaurant. For example, the best overall restaurant in a given area, which includes all types of restaurants (i.e. all restaurant sub-categories, such as Seafood, Asian, Italian, Indian, etc.), would display the indexed response of the overall best-rated restaurants in the user-defined area, regardless of subcategory, such as cuisine.

In another embodiment, the 'Similar User Rating Search' allows users to correlate their own preferred POI information with the complete compiled user-rating database, thus providing the best match of unknown POIs that the user would most probably prefer. In one embodiment, the search will match a searcher's rating history with those of users that on average have similar ratings for various categories previously rated by the searcher. The search then compiles a new subset of users that have similar ratings for the POIs that the searcher has previously rated or identified, and can then extrapolate POIs that the searcher has not rated should the searcher seek POI rating information for unknown POIs in a given area based on the searcher's position information. In one embodiment, a user that typically stays at one specific type of hotel, while on travel, may find that his/her favorite or typical hotel is not available or nearby. Thus, utilizing this form of search would enable a user to compare his/her own personal preferences with people of similar personal preferences that have rated various POIs unknown to the user initiating the search. The user is now able to utilize a POI rating search for unknown POIs based on his/her known preferences, thereby helping to narrow down the search to specific POIs that are unknown to the user, but that the user would probably like.

DETAILED DESCRIPTION OF THE EMBODIMENTS

Figure 1:
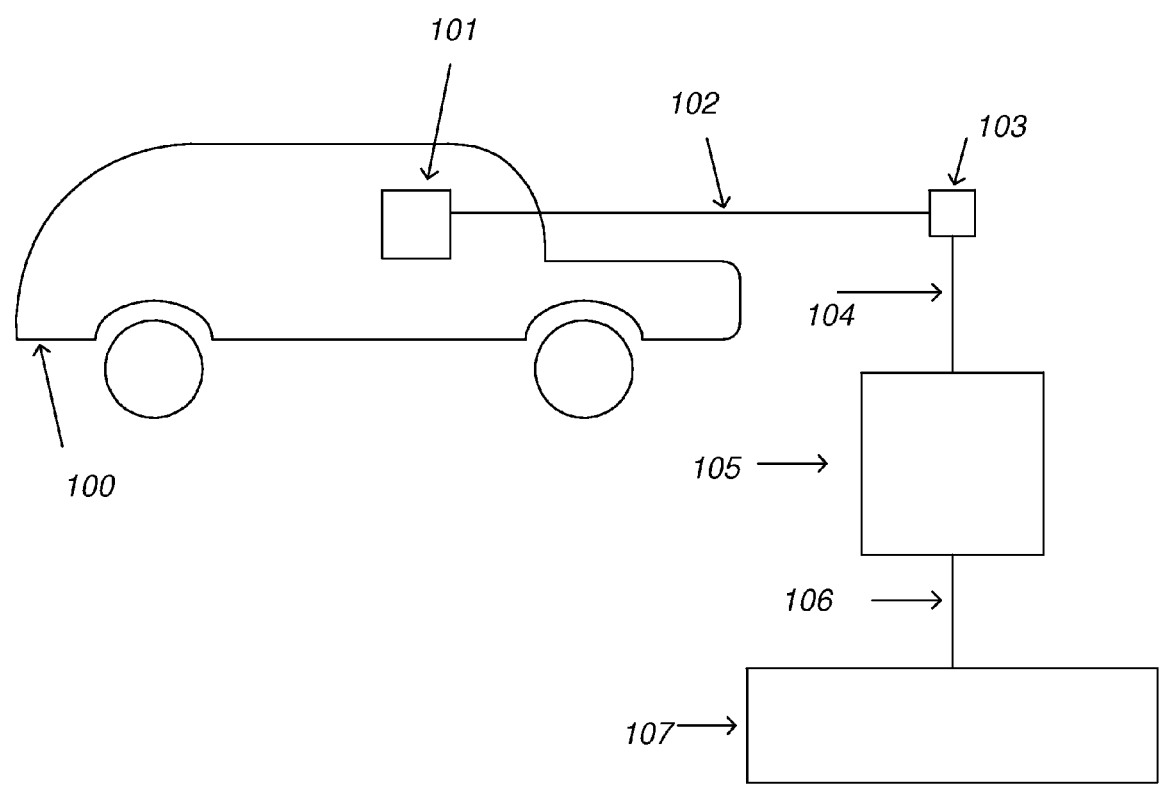
FIG. 1 illustrates how a typical navigational device is connected, through the Internet, Intranet, or Extranet, with the networked online database and application rating server search engine.

The embodiments of the present invention provide methods and systems for enabling a navigational device to search, rate, and navigate to various POIs from a navigational device's current position. The POI spatial rating search allows users to search for desired POIs based on a specified rating metric. In one embodiment, a user may want to find the closest seafood restaurant that is generally most popular with users that have previously rated such restaurants in the area. Additionally, that user may want to have real-time driving directions to the desired POI of interest, where the driving directions take into consideration street speed limits, traffic information, and street turn restrictions.

The present invention also provides a method and system for allowing users to rate specific POIs based on their current location and various rating categories, such as quality of service or décor, or average price per entrée. In one embodiment, a user that has visited a POI can rate the POI based on the aforementioned rating categories, such as various quantitative factors or user experiences including decor, service, food, location, etc., or based on various pricing structures, such as the estimated cost of the POI service, average restaurant meal price, or a typical amusement park gate fee. Additionally, the system can prevent users from rating POIs that are outside of their current location. This prevents a user from rating a specific POI chain or franchise based on a particular experience at a local branch. Users would be able to update their rating for any POI after they have entered a particular rating, regardless of their current location.

The present invention is preferably functional with or without a real-time network connection to an Online Database and Application Rating Server Search Engine (ODARSSE). When there is no network connection possible, a local version of the ODARSSE can be loaded onto the device to enable such searches. This local version of the ODARSSE is known as the Local Database and Application Rating Search Engine (LDARSE). In one embodiment, a user can specify an area, such as a city, town, county, state, etc., that they expect to be traveling within. This allows the user to download data specific to a given region that enables a standalone spatial search engine without the need for real-time network connectivity. The only caveat is that the data that is used to calculate POI searches may not be current or may be outdated. In one embodiment, the user would download the data necessary for the local search engine by means of a CD-ROM, data file, or hot synching operation with a local computing device, which can be connected to the Internet and thus the ODARSSE. Additionally, the user would still be able to rate specific POIs, and that rating information could be incorporated into the user's personal searches, but would not be collectively available to other users until such data is transferred to the ODARSSE via a network connection. When connected to the ODARSSE, the system provides authentication and authorization protocols to establish that a user is genuine and to verify the level of authority each user is granted, such as for differentiating services provided by the ODARSSE.

The system provides various methods for obtaining driving directions to any specific POI and delivering them to the user, such as by a graphical user interface display or by using a speech interface device, or other various interfaces. In one embodiment, after a user has searched a specific POI with some preferred indexed rating, the user may obtain driving directions, or other navigable directions, such as azimuth, elevation, and distance directions, to the desired POI. This is possible via either a networked connection to the ODARSSE, or using a standalone navigational device with a local storage device, such as a memory device or hard disk.

Figure 2:
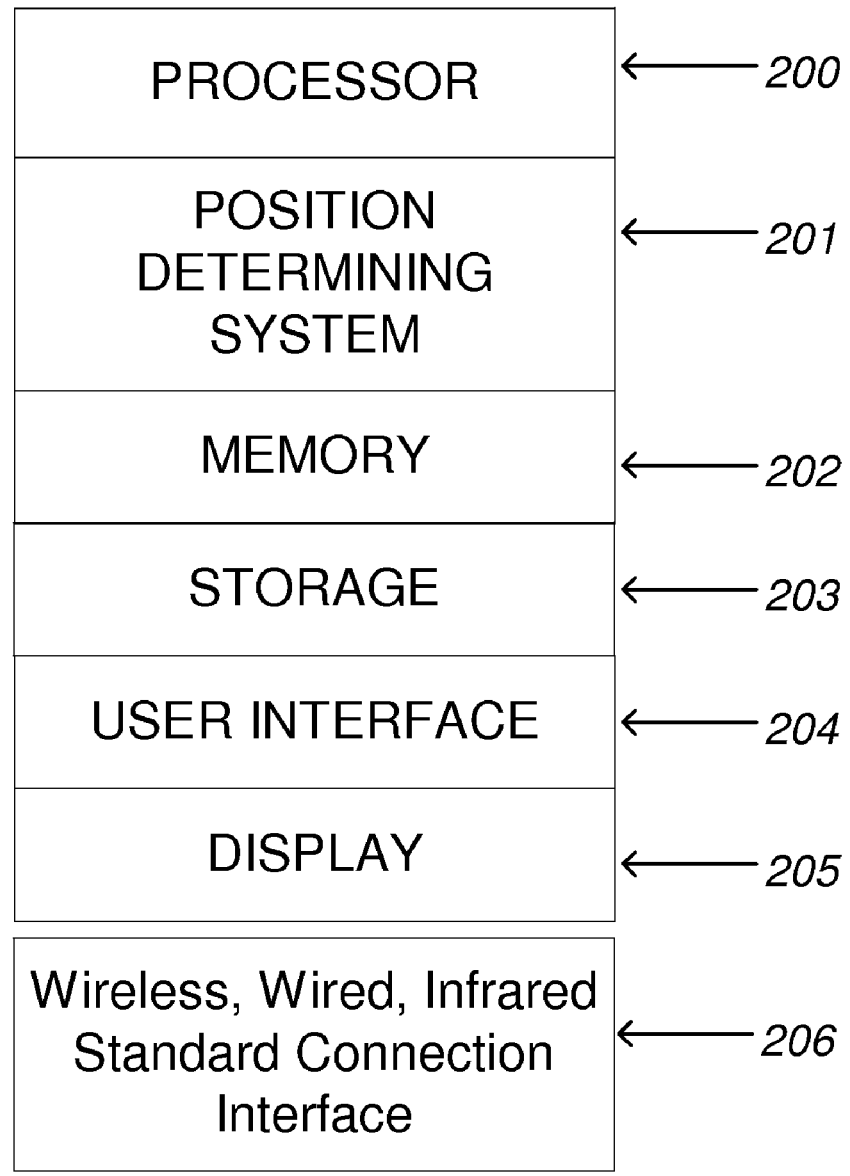
FIG. 2 illustrates the typical components of a navigational device, with or without a wireless, wired, or infrared connection interface.

FIG. 1 illustrates a preferred embodiment of the present invention for the navigational system and method for providing a POI rating search. A typical navigation device 101, as illustrated in FIG. 2, consists of a processor 200, a position determining system 201, such as GPS, a memory system 202 and a storage system 203 (where both the memory and storage systems can be combined or separate), a user interface 204, a display device 205 (a user interface and display can be combined, such as with touch screen displays), and may include, but is not required to include, a wireless, wired, or infrared connection interface 206, or the like, to enable communication with other devices or systems. A typical navigational device 101, shown in FIG. 1, can either be a standalone device or connected 102 to a base station 103, via a wireless, wired, or infrared connection, for example. The base station 103 is then typically connected 104 to the Internet, Intranet, or Extranet 105, which is then connected 106 to the ODARSSE 107. A navigational device is shown here in a typical motor vehicle 100, which is not necessary, and may be considered to be an in-vehicle navigation system, wireless cellular telephone, wireless or non-wireless PDA, or personal computer, etc., and enables the input of position information to the device in various formats and configurations.

Figure 3:
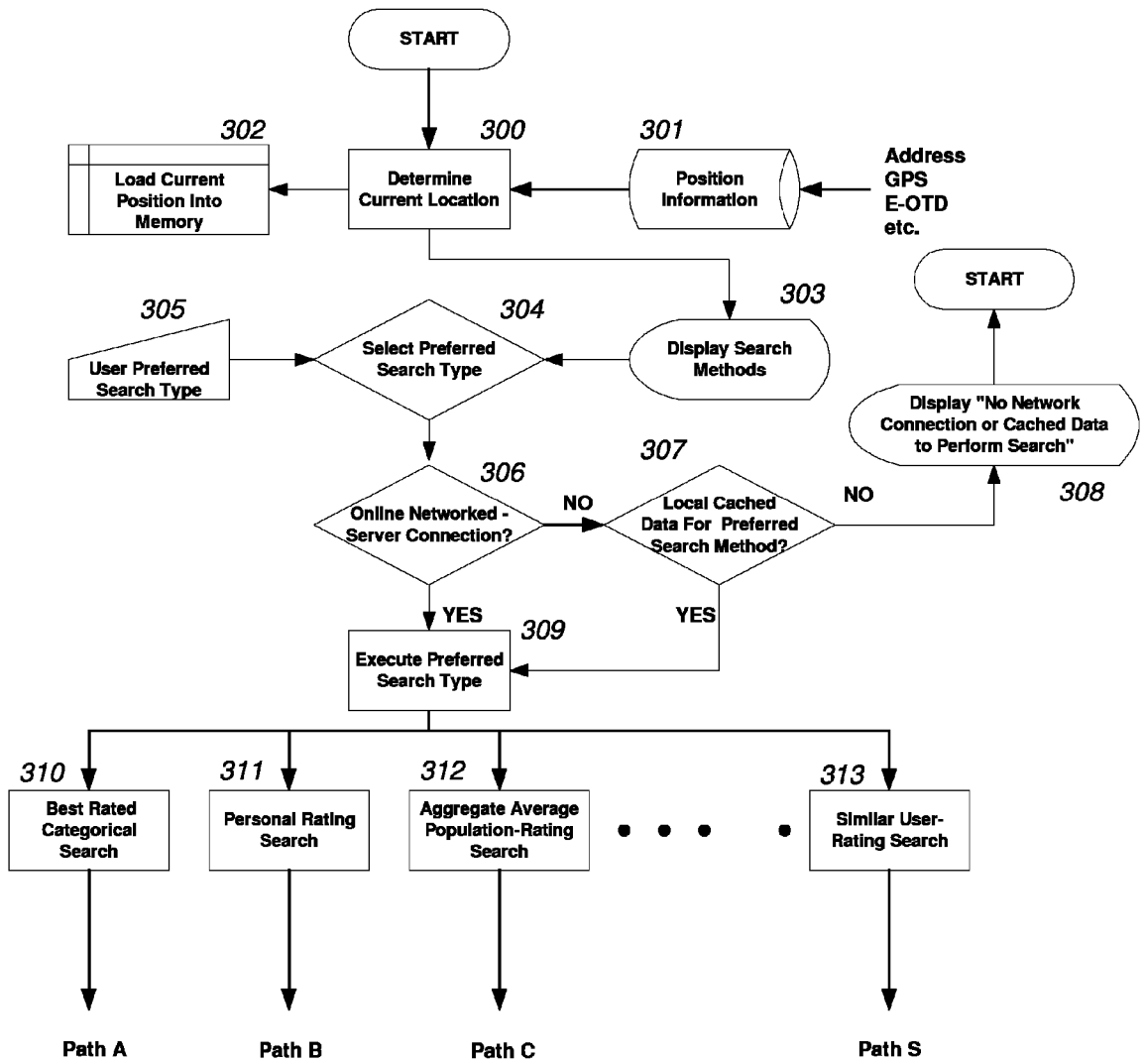
FIG. 3 illustrates a flowchart of the point of interest spatial rating search method and system in accordance with a preferred embodiment of the present invention.
Figure 9:
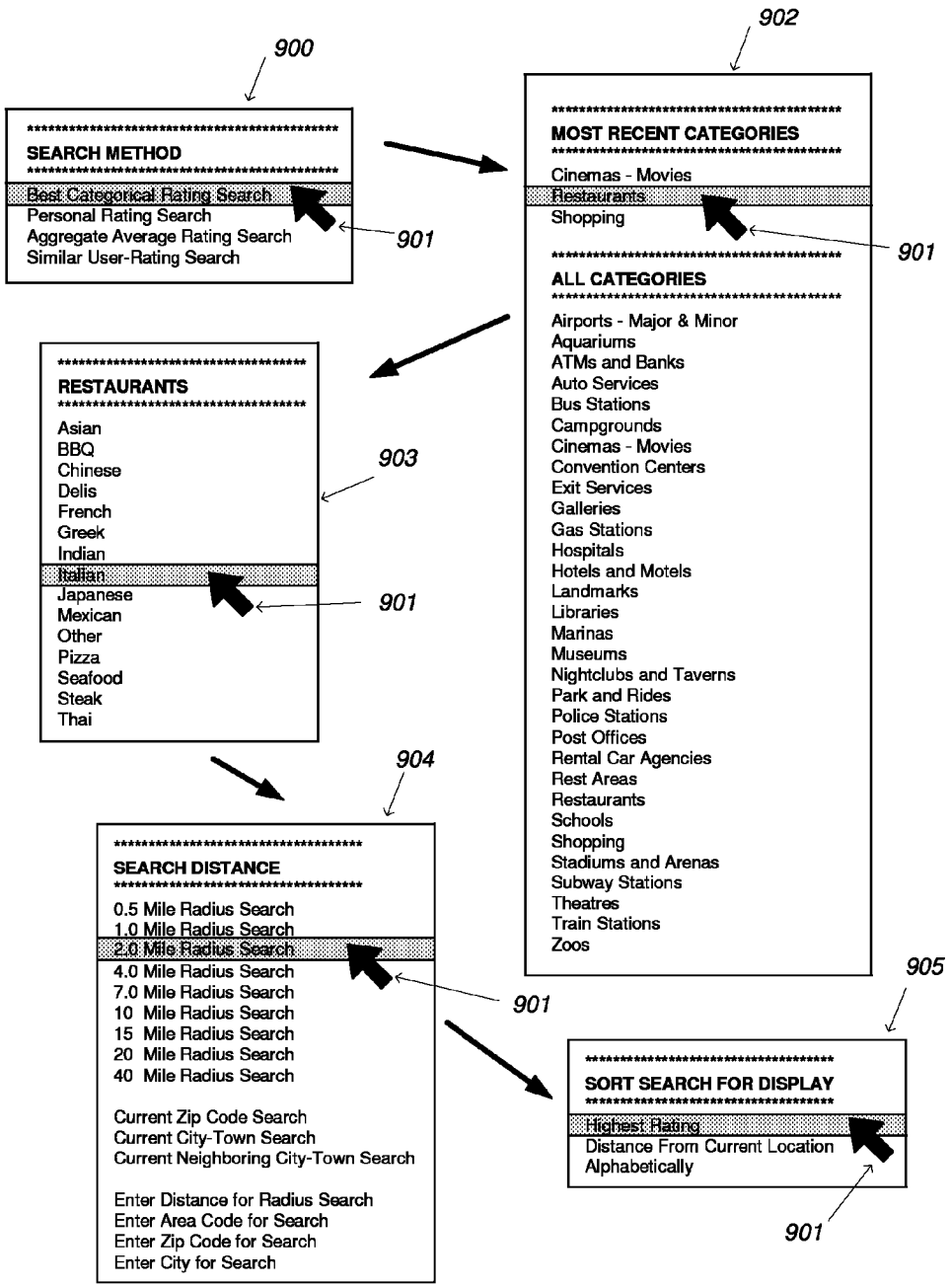
FIG. 9 illustrates a typical display process for the Point of Interest Spatial Rating Search Method and System.

When a user wants to locate a preferred POI for a given location, using a navigational device 101, a user can search various POIs based on specified preferred search criteria and the user's position information. When a user initiates a search, as illustrated in FIG. 3, the system determines its current location 300 from various forms of possible position information 301, such as Global Positioning Satellite (GPS) system, Enhanced Observer Time Difference (E-OTD) (enhanced methodology for detecting the position of a transmitter, e.g. cell phone), or address information (e.g., street, city, zip code, etc., information). This current position information is stored into local memory 302 for later use. The system then displays 303 the available search methods 900 (FIG. 9) to the user, such as 1). Best Categorical Rating Search, 2). Personal—Favorites Rating Search 3). Aggregate Average Rating Search, or 4). Similar User-Rating Search. After the user selects 304 the preferred search type 305, typically by using an input device such as an icon pointer 901, the system initiates a check 306 to see if the current device has a network connection to the ODARSSE 107. If there is a network connection to the ODARSSE 107 then the system executes 309 the preferred search type, such as the 1). Best Categorical Rating Search 301, 2). Personal—Favorites Rating Search 311, 3). Aggregate Average Rating Search 312, or 4). Similar User-Rating Search 313, amongst other possible search methods including a combination of the disclosed search methods.

If there is no network connection to the ODARSSE 107 then the system determines 307 if there is local cached data present in either memory 202 or storage 203 on the navigational device. If there is no local cached data present, the system displays 308 that there is no network connection or cached data available to perform the necessary POI rating search. If there is local cached data present, the system executes 309 the preferred search type, as described above.

Figure 4:
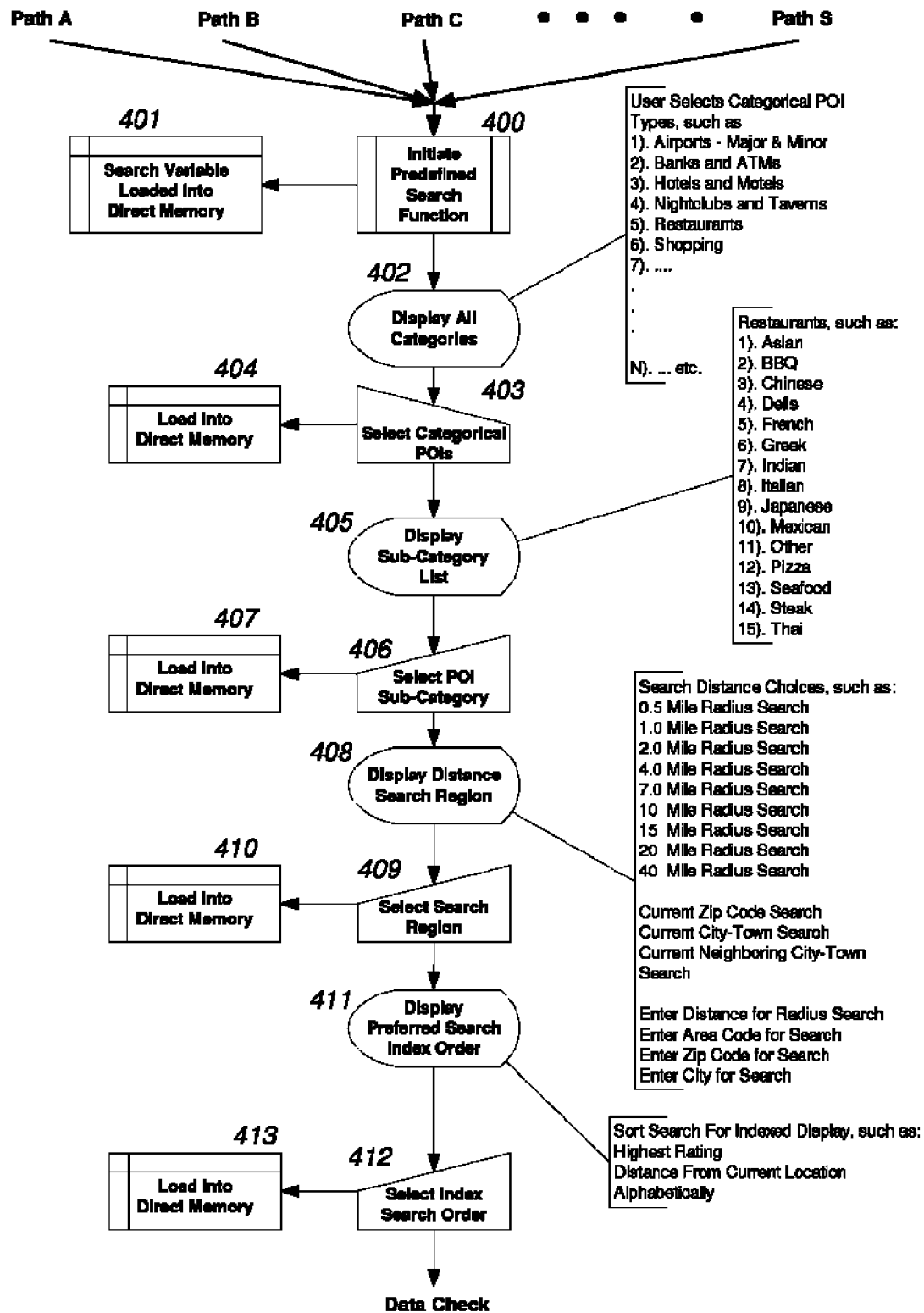
FIG. 4 further illustrates another flowchart for the point of interest spatial rating search method and system in accordance with the preferred embodiment of the present invention.

After a preferred search method has been identified, as illustrated in FIG. 4, the system initiates a predefined search function 400 tailored to that specific search. The specific search executed is stored into local memory 401 for later use. The system then displays 402 the searchable categorical POI types, such as 902 1). Airports—Major & Minor, 2). ATMs and Banks, 3). Hotels and Motels, 4). Restaurants, 5). Shopping, etc. After the user selects 403 the specific category to search by, typically by using an icon pointer 901, the systems loads the appropriate information into local memory 404. The system then displays 405 the sub-category information list 903 associated with the specific previous overall category, such as for the category of restaurants. The sub-category list can include, 1). Asian, 2). BBQ, 3). Chinese, 4). Delis, 5). French, etc.

After the user selects 406 the sub-category list, again typically using an icon pointer 901, that information is loaded into local memory 407. The system then displays 408 the appropriate distance search region, which can be stored as a user preference to avoid its selection every time a search is done. The search distance display 904 shows various forms of search criteria, such as various search radius distances, zip code search, city-town search, or neighboring city-town search, as well as various user inputted radiuses and user-described zones. Once again, this information is typically selected using an icon pointer 901, such as a mouse, but can be done using other forms of user input, such as a keyboard. Once the region information has been selected 409, the search region information is loaded into local memory 410 for later use. The system then displays 411 the search sort order 905 for listing the returned search results, such as by 1). Highest Rating, 2). Distance From Current Location, or 3). Alphabetically, amongst others sorting preferences. The user preferably then selects 412 the preferred method to sort the return search response, which is typically done using an icon pointer 901. Additionally, this information can be also stored in the user's preferences information or dynamically changed once the search information has been returned. The indexed sort information is also loaded into local memory 413 for later use.

Figure 5:
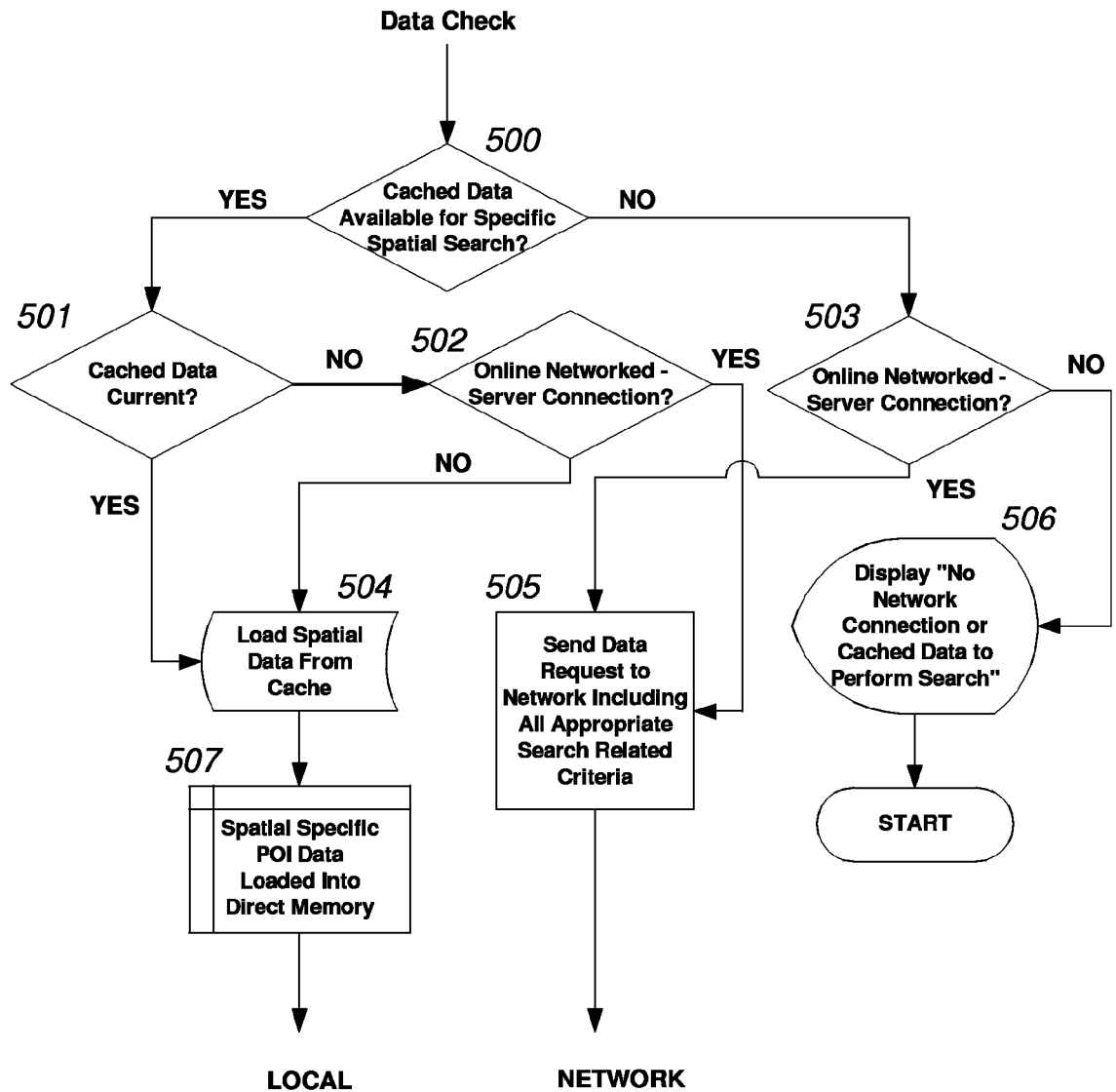
FIG. 5 further illustrates a flowchart for the point of interest spatial rating search method and system in accordance with the preferred embodiment of the present invention.

Once the appropriate search criteria is selected by the user, the system checks 500, as illustrated in FIG. 5, if the necessary search information is spatially cached on the local device. This is necessary in order to verify if all sub-categories, data fields, and records are valid and present for the user's current local position, which may have changed significantly during the time the user was selecting the search criteria if, for example, the user was in a moving motor vehicle 100. If the system determines 500 that the cached data is available, the system then looks at the time stamp associated with the cached data to verify 501 that the data is current. If the data is not current, typically defined as more than a day old, the system will check 502 if a network connection is currently available, since in a wireless environment mobile devices typically move in and out of network connectivity regions. If there is a network connection, the system then sends 505 the search criteria compiled from the previously inputted search information, such as 401, 404, 407, 410, and 413, typically over a TCP/IP connection to the ODARSSE 107. If there is no network connection, the system loads 504 the spatial data from cache into direct local memory 507. Alternatively, if the local cached data is current 501, the system will then load 504 the spatial data from cache into direct local memory 507. If cached data is not available for the specified spatial search 500, the system will then check 503 if there is a network connection to the ODARSSE 107. If so, the system will then send 505 the search criteria, complied from the previously inputted search information, such as 401, 404, 407, 410, and 413, typically over a TCP/IP connection to the ODARSSE 107. If there is no network connection, the system will display 506 to the user that no network connection or cached data is available to perform the specific search.

Figure 6:
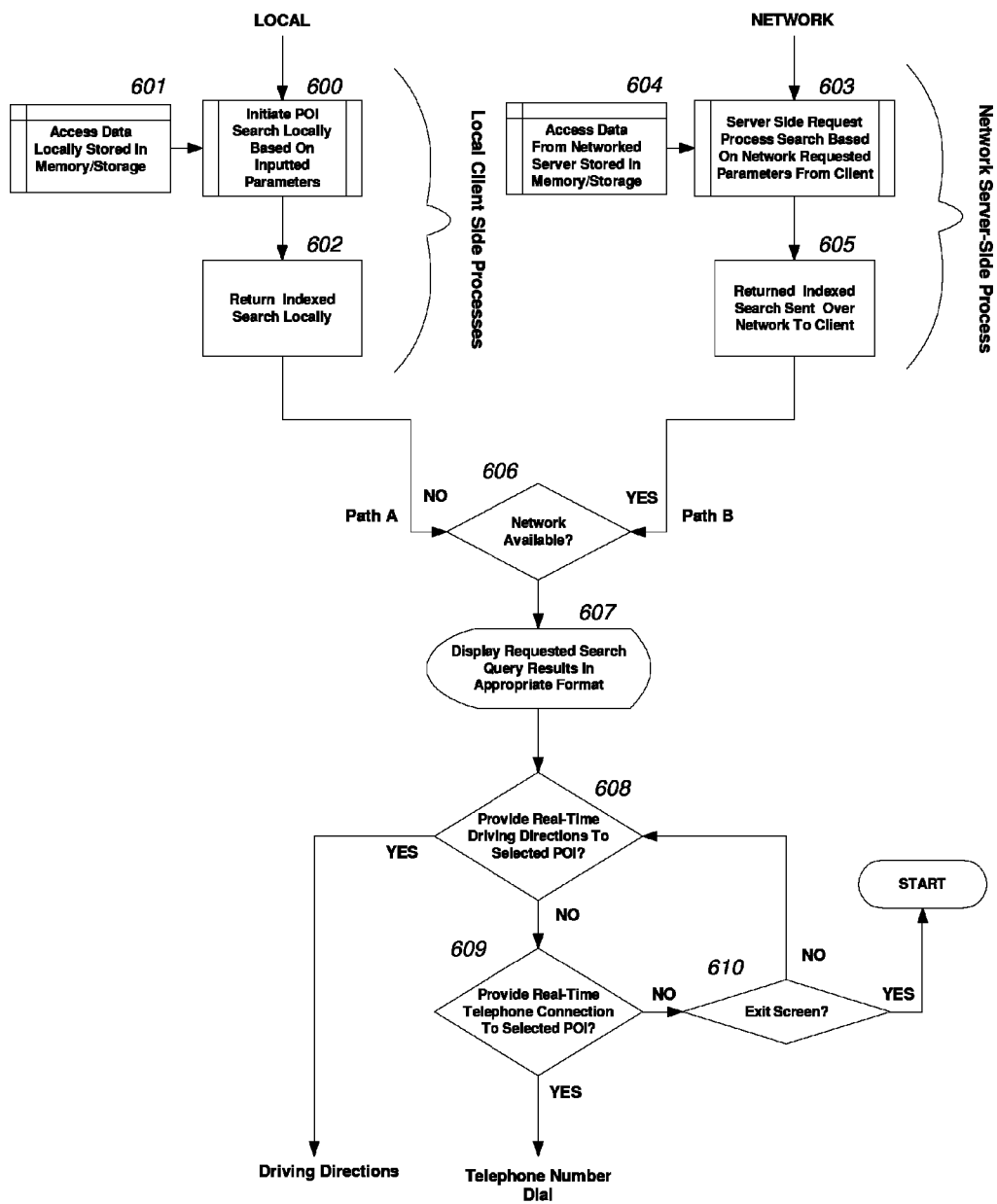
FIG. 6 further illustrates a flowchart for the point of interest spatial rating search method and system in accordance with another embodiment of the present invention.

Since the data can exist both locally and over the network, as shown in FIG. 6, the specified search can be accomplished by following two different paths of operations. If the network is available 607, the network path is chosen for the search (i.e., Path B). If a network connection is not possible, the local path is chosen for the search (i.e., Path A). This path is determined 607 based on the current availability of network connectivity. If a network connection is established (Path B) the ODARSSE 107 processes 603 the received search criteria and accesses the appropriate information from the server 604 data center. The search response is indexed and sent back 605 to the device requesting the search. If a network connection is not possible the LDARSE, which is software that resides in the navigational device 101, processes the information and initiates an appropriate search 600 from data stored locally 601. The search response is indexed and formatted locally 602 for use on the local device that initiated the search. After the search results have been formatted and indexed, the information is sent to the user typically by displaying the results 607. However, it is possible for a text-to-speech engine to audibly apprise the user of the returned search results. In another embodiment, the audio search results can be delivered by a VoIP network protocol or streaming audio formats from the server to the navigational device 101. This allows most of the processing to be completed by the networked server system (ODARSSE 107), where there are abundant resources, such as memory, processing power, and electrical power, since most mobile devices typically do not have an abundance of these resources relative to the networked server system (ODARSSE 107).

Figure 10:
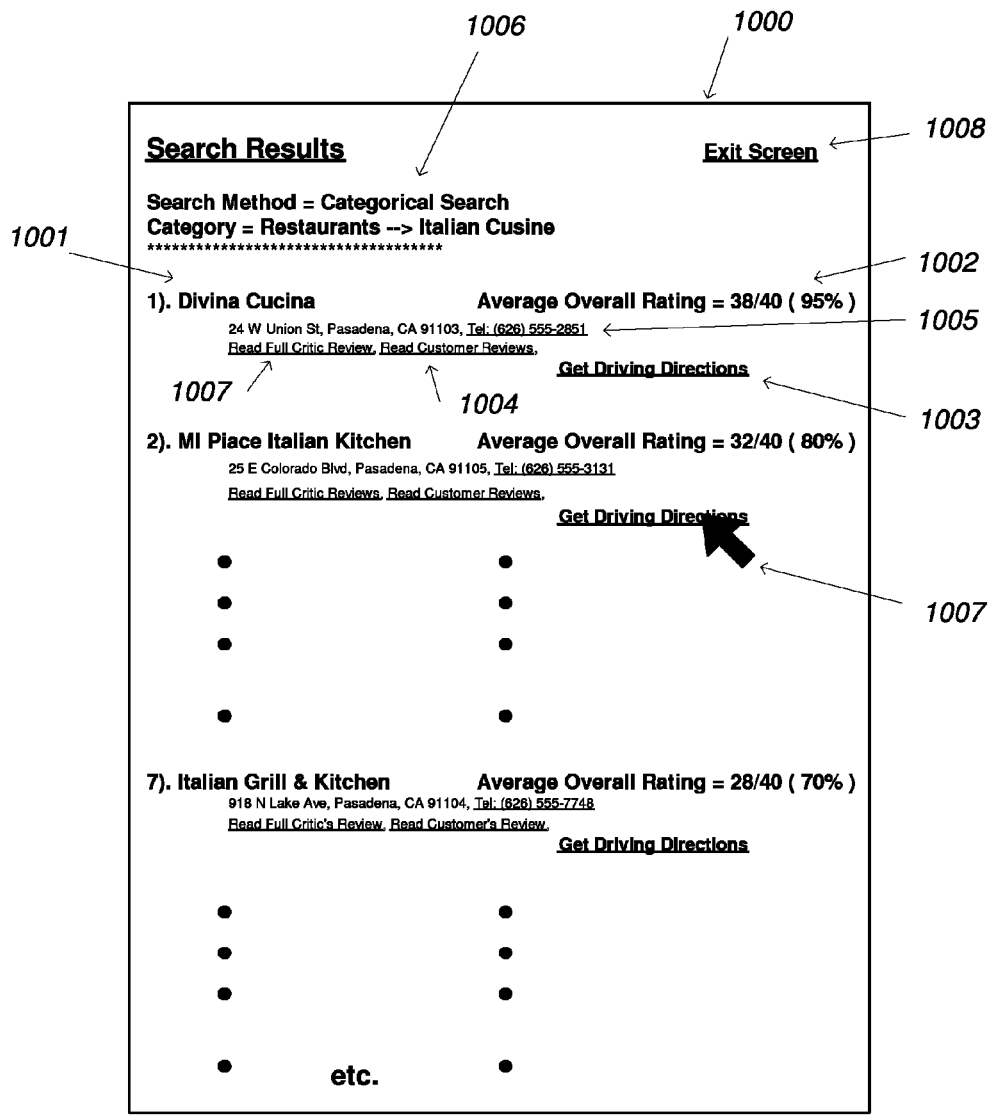
FIG. 10 illustrates one embodiment of an indexed search response display for a specific POI category.

The search results can be displayed 607 in many formats, including, for example, audio format. As shown in FIG. 10, a typical search display 1000 shows various fields related to the specified search method and category. In this embodiment, the search category is displayed 1006 as a categorical search method with a sub-category of Italian cuisine. The display 1000 window has indexed the results 1001 by the highest overall rating 1002, according to the average of all ratings given by users for that POI.

Figure 11:
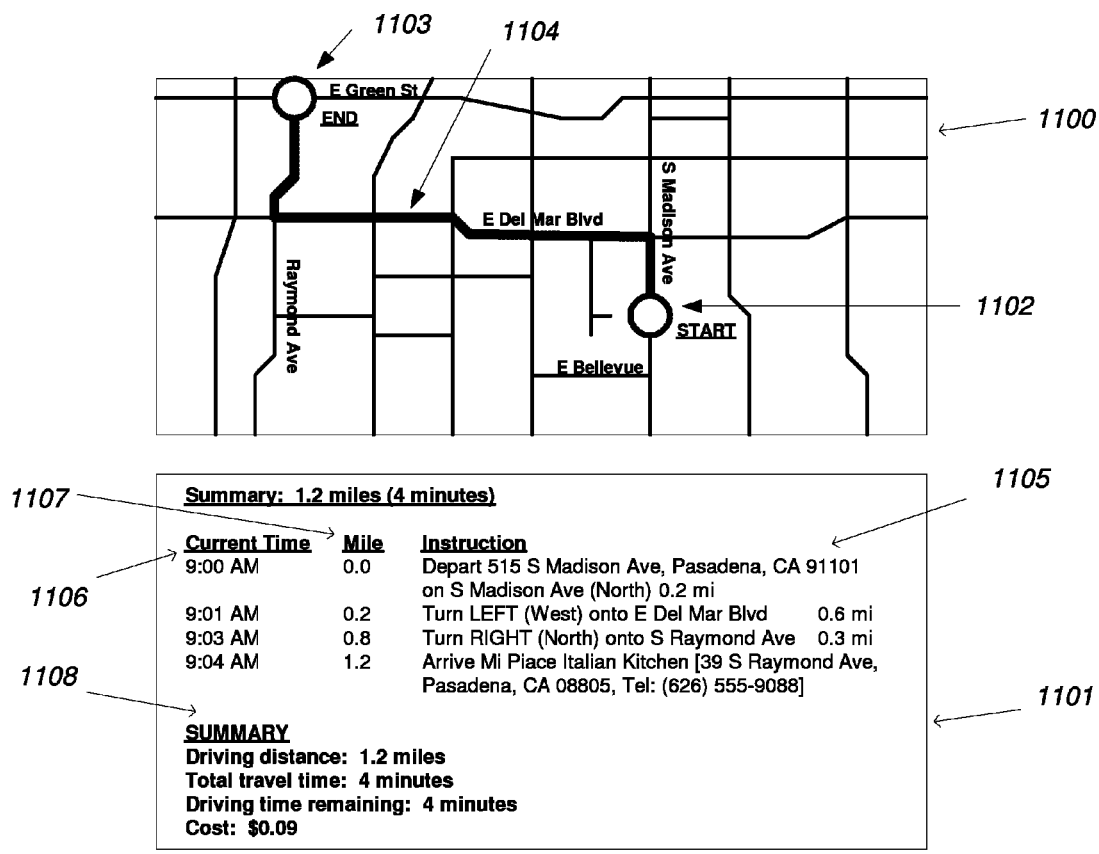
FIG. 11 illustrates a map display of varying resolution and size and an accompanying textual display of various trip and route information.

In one embodiment, for each indexed POI, the results preferably provide the user with the POI's name 1001, telephone number 1005, professional critic's review 1006, individual user's reviews 1004, and a link to initiate a 'door-to-door' driving direction calculation 1101 with display 1100 (FIG. 11). In this embodiment, the search results display 1000 provides the user with the most highly rated POIs in a given region based on the user's selected preferences and taking into account all other users' ratings. In this present embodiment, the user can navigate the links, similar to an HTML web page in a web browser, by clicking on the appropriate links, such as using an icon pointer 1007 to initiate those links.

While the search results display 1000 is active, the system is searching for events that occur, such as various link click events or an exit event. Some of the most important links are the 'Get Driving Directions' 1003, 'Telephone Number'

1005, and 'Exit Screen' 1008 events. This event loop is illustrated in FIG. 6 as various conditional statements 608 & 609 & 610. If the user initiates an 'Exit Screen' link 1008, then the search results display screen terminates 610 and the system starts over. If the user selects a 'Get Driving Directions' link 1003, the system initiates 608 a driving direction calculation to the desired POI that the selected driving direction link was associated with.

Figure 7:
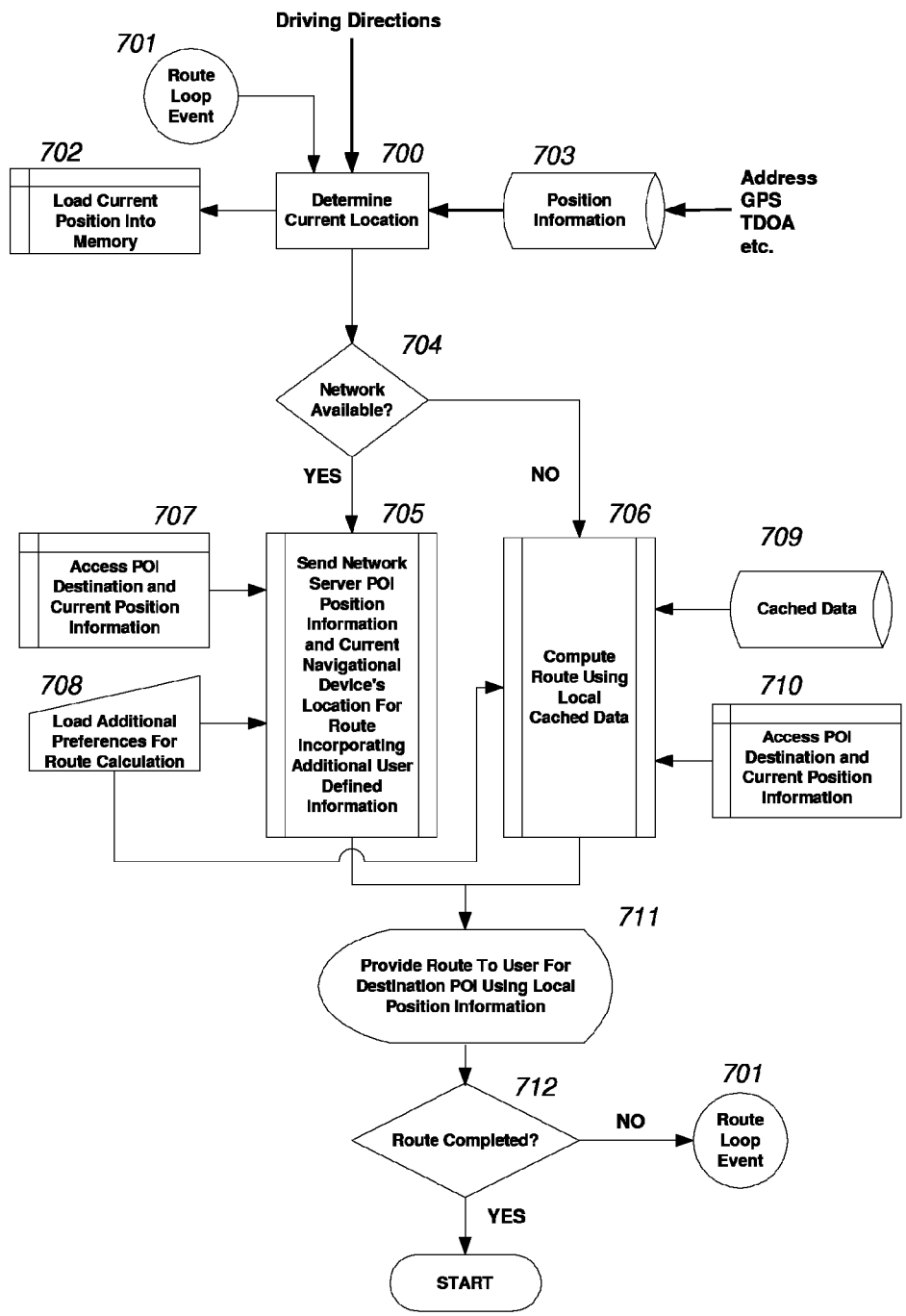
FIG. 7 further illustrates a flowchart for the point of interest spatial rating search method and system in accordance with another embodiment of the present invention.

In one embodiment, after a desired POI has been chosen and a user requires real-time driving directions to such desired POI, the system will calculate the necessary driving directions, as illustrated in FIG. 7. The system determines its current location 700 from various possible forms of position information 703, such as Global Positioning Satellite (GPS) system, Enhanced Observer Time Difference (E-OTD) (enhanced methodology for detecting the position of a transmitter, e.g. cell phone), address information (e.g., street, city, zip code, etc., information). This current position information is preferably stored into local memory 702 for later use. The system then determines 704 if a network connection to the networked server system (ODARSSE 107) is currently available.

If the navigational device has network connectivity, the device preferably incorporates both the current position and remote position information 707 in the calculation of a route by the network server system (ODARSSE 107). Additionally, further preference information 708 can be included in the route query, such as real-time traffic information, or street turn restrictions. The system then sends 705 all of the appropriate information necessary for generating a route to the ODARSSE 107 across the network. The information is then displayed 711 to the user, in real-time, on a GUI display appropriate for the specific client device that initiated the search. The system then determines 712 if the navigational device has reached the desired POI by correlating its current position information 702 with the POI position information 605 or 602. If they are the same 712, then the user has reached the destination POI, the route has been completed, and the system starts over. If they are not the same, the system then starts the route loop over 701 based on an event change.

When there is no network availability, the system preferably computes 706 the route using locally cached data 709 and the current position information 702 with the POI position information 605 or 602, in addition to certain route preferences 708. The route calculation can use the route preferences 708 incorporating real-time traffic updates only when network connectivity is available. Real-time traffic information is not incorporated in the route calculation when there is no network connectivity.

As illustrated in FIG. 11, the route information display embodies various related route information. In one embodiment, the window consists of a map display 1100 of varying size and resolution, and a text display 1101. The map display can illustrate the original start point of the route 1102, the actual highlighted route 1104, and the end point of the route 1103, or the desired POI location. The text display 1101 illustrates the current time 1106, starting at the start position 1102, for each and every new road, highway, segment, etc. The display 1101 also shows the distance 1107 to the new road, highway, segment, etc on the route and the textual driving direction for each. The text display 1101 also provides a summary information of the total trip 1108, including information such as the total driving distance and time, total travel time, and the total trip cost, which can be based on various facts, such as car depreciation, gas usage, etc., where Miles Per Gallon (MPG) is typically the most common factor in calculating trip cost.

Figure 8:
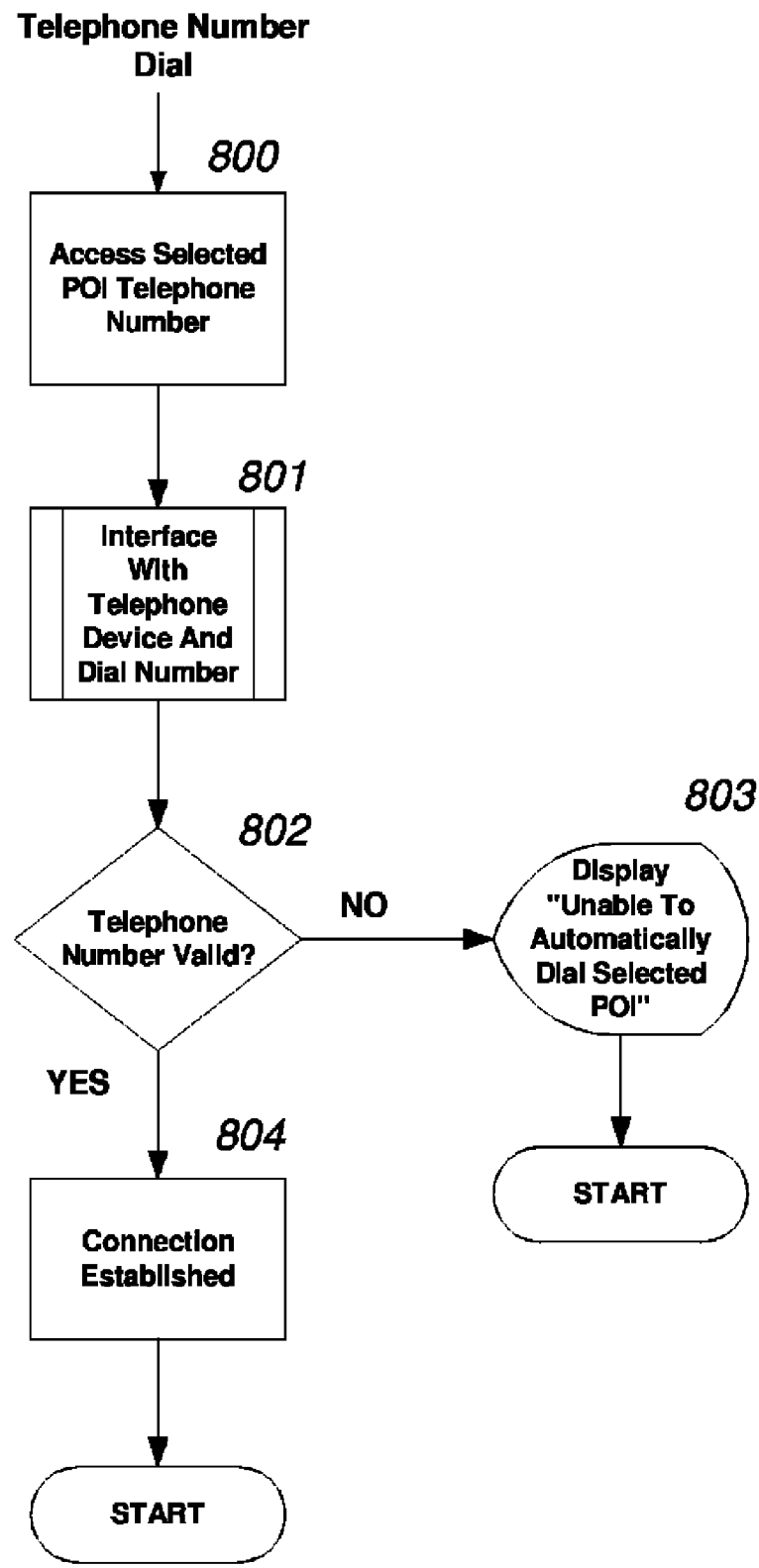
FIG. 8 further illustrates a flowchart for the point of interest spatial rating search method and system in accordance with another embodiment of the present invention.

As shown in FIG. 6, if a user selects a 'Telephone Number' link 609, the system locates and accesses 800 the stored telephone number for the POI associated with the selected link. This process is illustrated in FIG. 8. After the telephone number has been accessed, the system interfaces 801 with the API or firmware of the device to initiate a telephone call, which can be typical navigational devices, such as GPS-enabled wireless cell phones for example. If the number is not a valid number 802, due to inaccuracies in the POI data, then the system responds by informing the user 803 that the automatic dial capability is not possible with this specific telephone number. If the telephone number is valid 802, is successfully dialed, and a connection is established, the system acknowledges 804 by passing display control over to the specific voice service if necessary.

Figure 12:
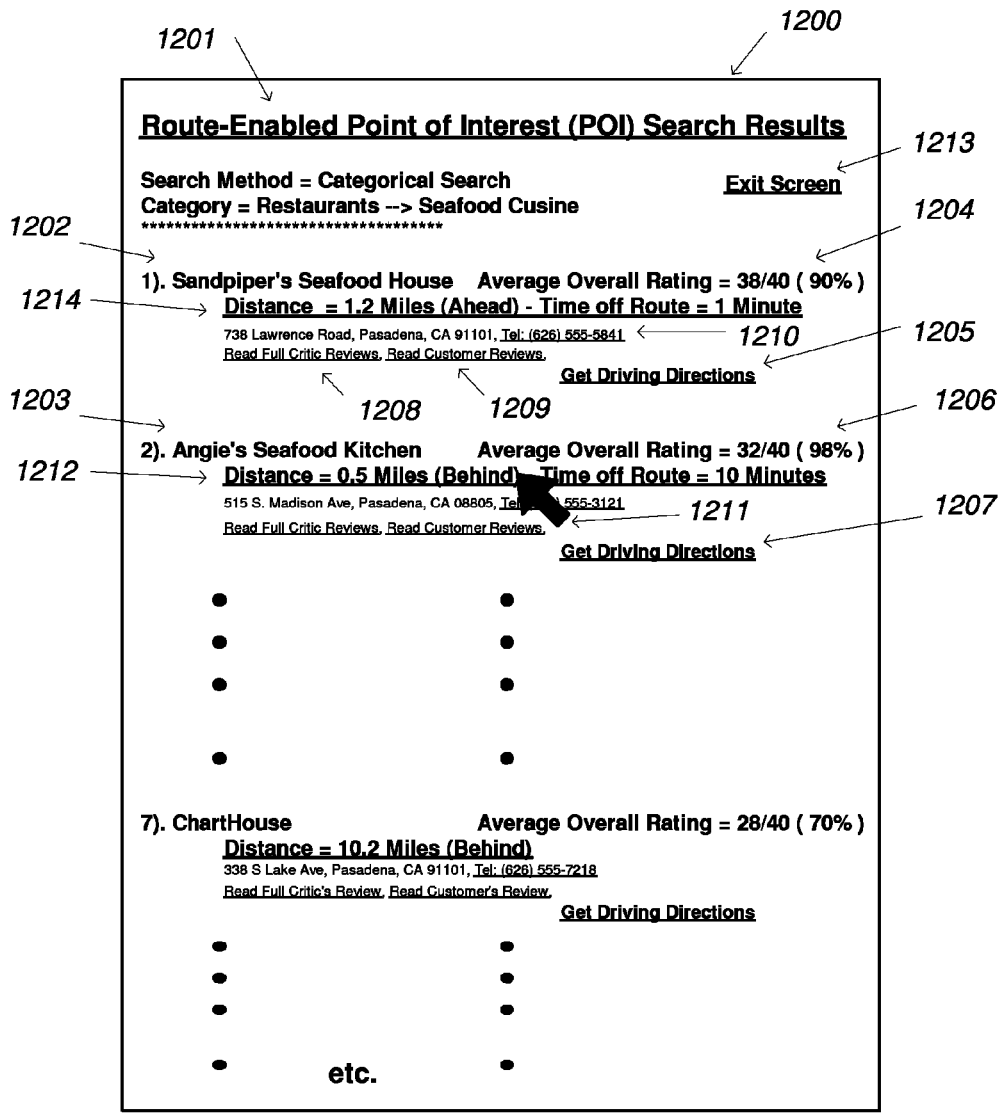
FIG. 12 illustrates one embodiment of a route-enabled POI search response display.
Figure 13:
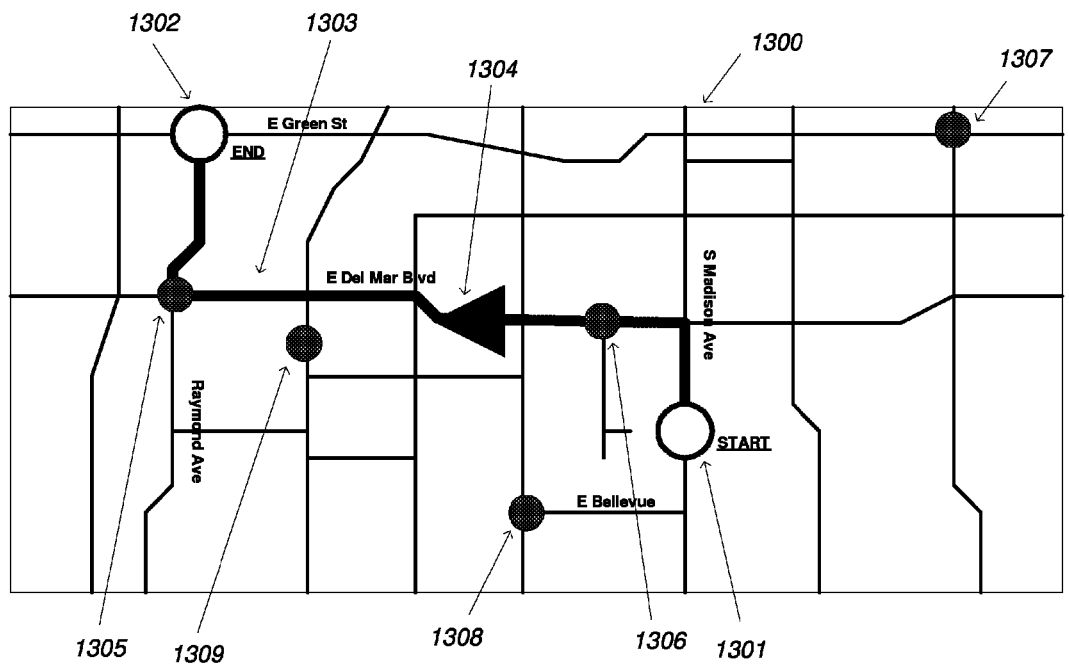
FIG. 13 illustrates one embodiment of a route-enabled multiple POI search, based on a previously defined driving route.

The system is also capable of finding POIs based on ratings and incorporating the current route information 1303 that the navigational device is using to index search results for optimal overall route efficiency, such as shown in FIG. 13. In this embodiment, a user has a defined route from a start position 1301 to an end position 1302, and, while navigating on the predefined route 1303, the user may want to find the highest-rated restaurant in the nearby area 1300 and closest to the user's current position minimizing the drive time off the route. Using a variety of aforementioned search methods, the search might return various restaurants 1305 & 1309 & 1308 & 1306 & 1307 that all have various ratings and are in the vicinity of the navigational device's current position 1304. The search results display 1200, as shown in FIG. 12, provides returned results based on the navigational device's current route information 1303 and current position 1304, as illustrated in the search result title 1201. The POI indexed return is based on both the highest average ratings and the position of the various POIs. For example, the first two indexed POIs in the search results, 'Sandpiper's Seafood House' 1202 & 1305, and 'Angie's Seafood Kitchen' 1203 & 1306 are rated First and Second, respectively, even though the 'Sandpiper's Seafood House' 1202 & 1305 has an average overall rating score of 90% 1204 compared to 'Angie's Seafood Kitchen' 1203 & 1206 which has an average overall rating score of 98% 1206. This is because the locations of the two POIs, in relation to the device's current route and position on that route, were taken into account when indexing the returned results. 'Angie's Seafood Kitchen' is located 1306 0.5 Miles behind the navigational device's current position 1304, while 'Sandpiper's Seafood House' is located 1305 1.2 Miles ahead of the navigational device's current position 1304. Since 'Sandpiper's Seafood House' 1202 has a lower score 1204 than 'Angie's Seafood Kitchen' 1203, it would typically be indexed as the second choice, but due to the location of the navigational device 1304 and the position of both restaurants 1305 & 1306, and in order to avoid any route delays due to 'backtracking' and to have the most efficient route possible, the search results provided 'Sandpiper's Seafood House' 1202 & 1305 as the most optimal choice. Thus, the restaurant that is located nearest to the pre-defined route, closest to the navigational device, and near a portion of the pre-defined route that preferably has not already been traversed and requires minimal or no deviation from the pre-defined route, will have the highest indexed response. The other POIs, such as the 'ChartHouse' 1307, among others 1380 & 1309 were identified with lower indexed values either due to their location relative to the pre-defined route 1303, or their average overall user rating 1204 & 1206. Similar links, such as the professional critic's review 1208 and customer reviews 1209, and telephone number 1210, and driving directions 1205 & 1207 links are also present in this display 1200, which is similar to the previous indexed display 1000. One difference, in this embodiment, is that an added link is present 1214 & 1212, which shows the distance to the indexed POI and the driving time calculation (based on various factors such as the observed speed limit, traffic information, etc.) from the pre-defined route to the desired POI and back to the pre-defined route. Otherwise, these links 1214 & 1212 are identical to the driving directions link 1205 & 1207, but have a slightly different function for this application, since the navigational device is already in a pre-defined route.

Figure 14:
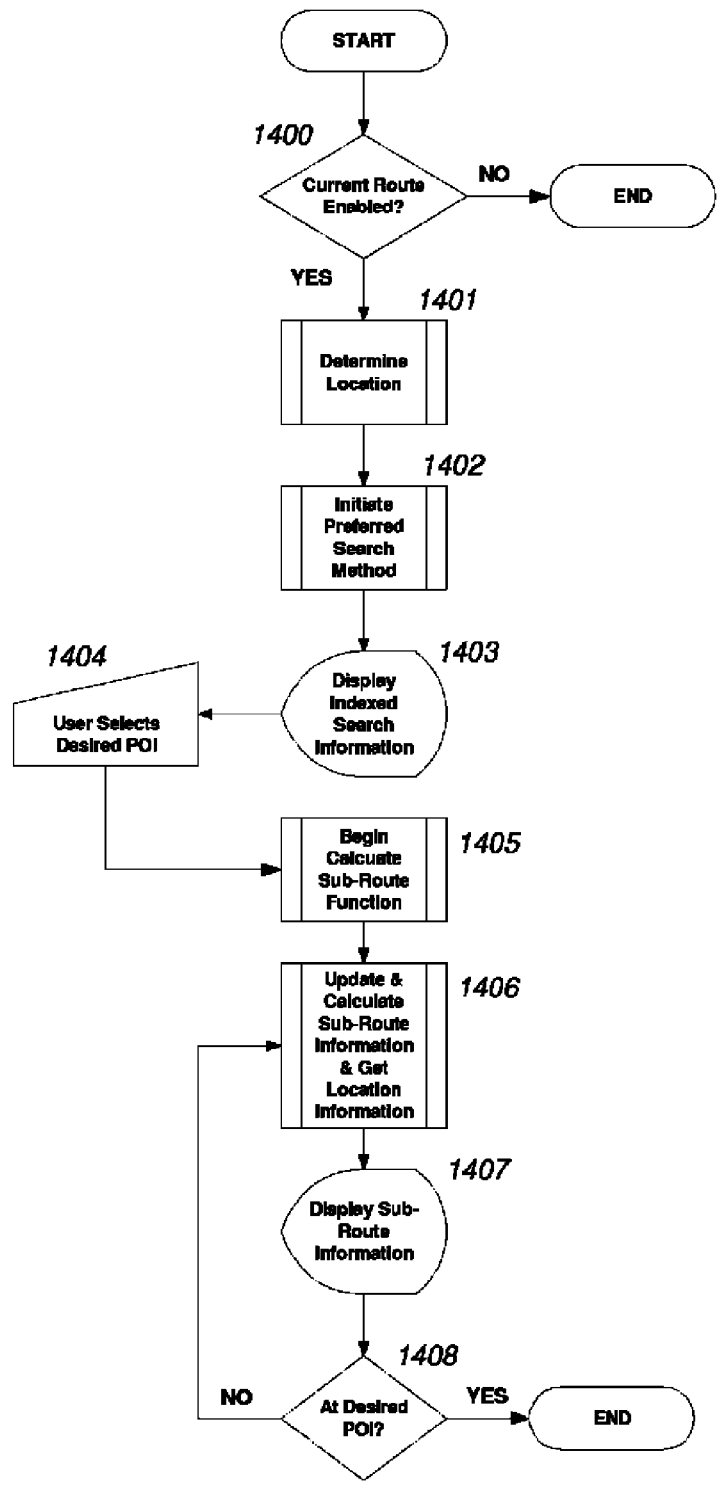
FIG. 14 illustrates a flowchart for calculating a sub-route to a nearby POI while the navigational device is engaged in an additional route calculation in accordance with an embodiment of the present invention.

When a device is traveling a pre-defined route, the system identifies if a current route is enabled 1400 (see FIG. 14), and, if so, the system initiates 1401 a location determination process, or otherwise exits the sub-route function. Once the location has been obtained 1401, the system initiates the preferred search method 1402 as previously described, and then displays 1200 the preferred indexed POI search information 1403. When the user selects the desired POI 1404, the system initiates the sub-route function 1405, that takes into consideration various map information and real-time parameters 1406, such as the current route information, current position information, traffic information, time-of-day information, etc., and then calculates the optimal route from the current location to the desired POI's location. Along the route, information is updated and displayed 1407 to the user, including such fields as map and route information of varying resolution and size, time left to reach destination, and other similar information, such as shown in FIG. 11 & FIG. 13.

The system preferably periodically checks 1408 to verify if the device has reached the desired POI, in which such a calculation often involves the incorporation of positional error information, which may be produced by multi-path error or Selectivity Availability (SA) error sometimes present in GPS receiver systems, and its correlation with the POI's location information and the navigational device's position information. If the device is not at the desired POI location, the loop starts again by updating the sub-route information and position information function 1406, or else the loop terminates since the navigational device has reached the desired POI location. The same function is used to return to the desired route, except the destination is the closest point on the pre-defined route, and utilizes current map information and real-time route information to calculate the route. Once the navigational device has returned to the pre-defined route, the previous function executes as normal until its desired route destination has been reached.

Various forms of searches are disclosed for the invention including, without limitation, Best Categorical Rating Search, Aggregate Average Population Rating Search, Personal—Favorites Rating Search, and Similar User Rating Search.

The 'Best Categorical Rating Search' allows the searching of various forms of ratings for a given end-category, such as a sub-category or category with no more sub-categories beneath itself. For instance, the restaurant category has various sub-categories beneath it, such as American (New), American (Traditional), Argentinean, Armenian, Asian, etc. These subcategories (e.g., Pizza) are defined as end-categories. Another category, such as Typewriters (i.e., Typewriter Stores) does not have a sub category beneath it, and is thus defined as an end-category. Additionally, various forms of quality factors are referenced for various forms of categories and sub-categories.

These rating quality factors preferably include decor, service, food, location (e.g., surrounding area condition), and various pricing structures, such as the estimated cost of the POI service, such as an average restaurant meal price or typical amusement park gate fee. The 'Best Categorical Rating Search' allows a user to search these end-categories based on various quality factors. In one embodiment, quality factors may include: Overall Customer Experience; Décor; Service (Quality & Speed); Food Quality; Surrounding Location (Cleanliness, Waterfront Location, Scenic View, etc.); Cost (such as Very Expensive ($$$$$), Expensive ($$$$), Moderate ($$$), Average ($$), Inexpensive ($)); Price Range ($50+, $30-$40, $20-$30, $10-$20, under $10. Etc.); Atmosphere—Dress Code (such as Formal, Casual, Sports, Live Music, etc.); and others.

Figure 15:
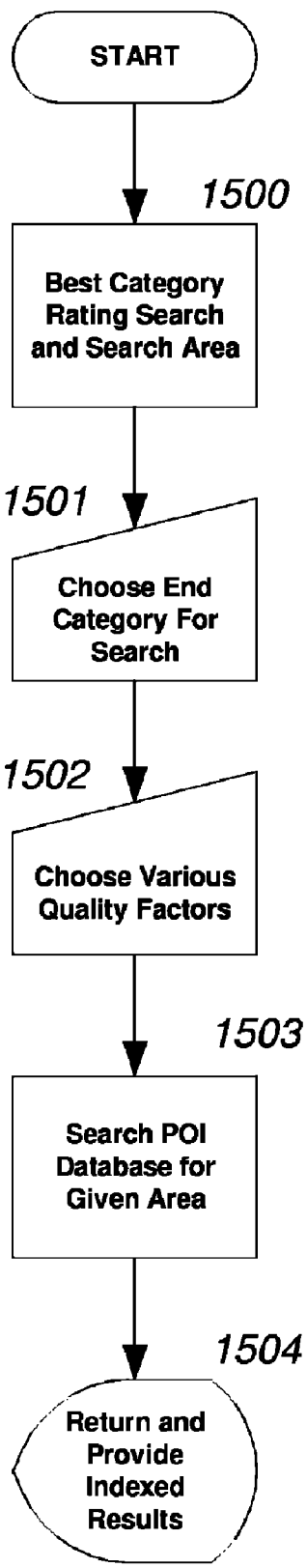
FIG. 15 illustrates a flowchart for the 'Best Categorical Rating Search in accordance with an embodiment of the present invention.

A user preferably initiates 1500 the 'Best Categorical Rating Search' and search area, as illustrated in FIG. 15, by selecting the appropriate end-category 1501 and the various quality factors associated with the POI 1502, such as those shown above (i.e., Overall Best, Décor, Service, Food Quality, Surrounding Location, Cost, Atmosphere). The POI search is then initiated 1503, and the system uses all of the available ratings for the various end-category POIs, and if there are not enough user ratings, typically less than 100 ratings, the system will use a professional critic's rating in addition to the aggregate users' ratings for display ranking until the minimum of say 100 ratings has been reached. In one embodiment, the overall rating calculated from the combination of the aggregate users' ratings and that of a professional critic during this initial case can be done using various methods, one being illustrated in equation EQ. 1.

$$SR = \frac{(CR \cdot (100 - NoU) + (AUR * NoU))}{100} \quad \text{(EQ. 1)}$$

Where SR=Specific Rating; CR=Critic Rating; NoU=Number of Users that Rated POI Quality Factor (Range=[0,100]); AUR=Average User Ratings.

Thus, a Critic's Rating would hold more weight when the Number of Users that have rated the given quality factor for the POI is small, but as the number grows, the critic's rating is less weighted and the users' average rating is more heavily weighted. The system then returns the specific rating results to the user 1504. The search can also incorporate the critic's rating information, regardless of the number of users in the aggregate ratings count, to provide a better method of rating various POIs.

Figure 22:
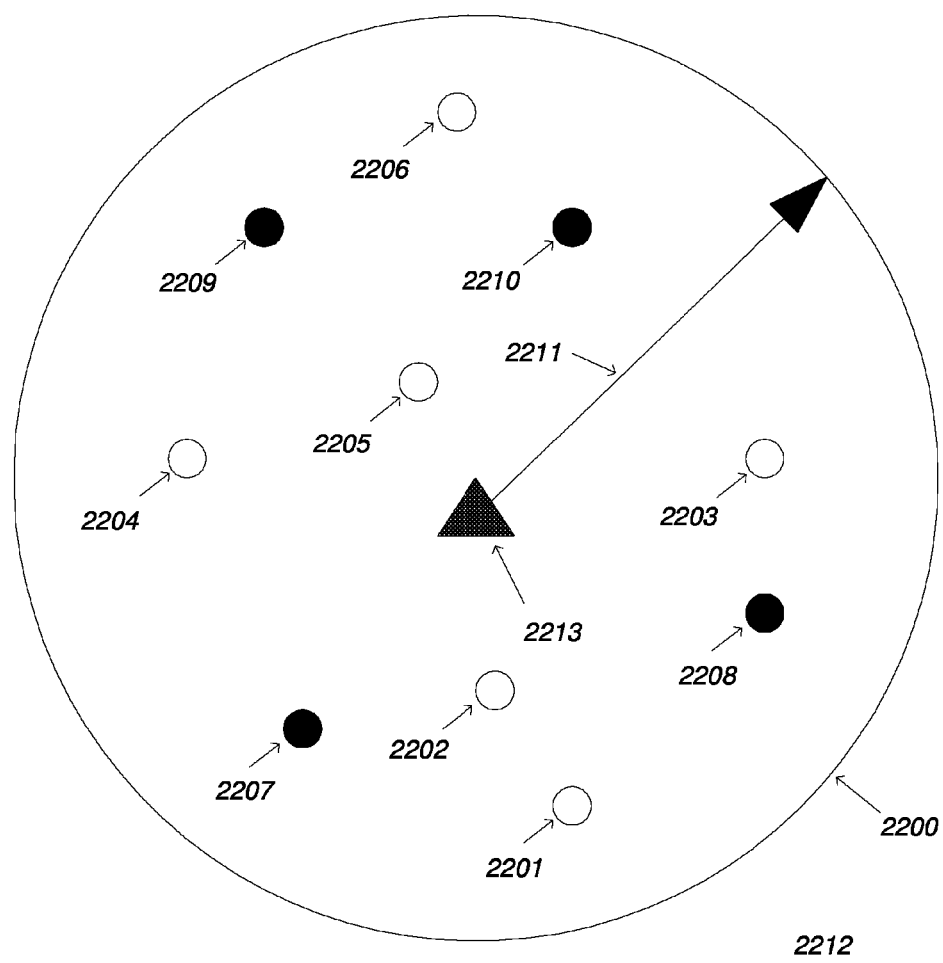
FIG. 22 illustrates a categorical radial search method for isolating POIs based on various quality factors relative to a user's position information in accordance with another embodiment of the present invention.

Additionally, the spatial searches for various search methods can incorporate many techniques. In one embodiment, a radial search using the 'Best Categorical Rating Search' method involves the location of the user initiating the search, the category to search within, the radius of the search window, and the various quality factors needed to perform the search. For instance, in one embodiment, a user wants to search for a seafood restaurant that has an overall average user rating of 37 or better within a given radius, where the origin of the search is the user's current position. As illustrated in FIG. 22, a user located at a given position 2213 initiates a 'Best Categorical Rating Search' 2212 based on a Seafood category and an overall quality factor average of 37 or better on a scale of 40. The search radius 2211 is set to be 1 Mile. The search checks all seafood restaurants in the given area 2200 that have a rating of 37 or better 2212. In FIG. 22, all of the POIs that do not meet the search criteria (2206, 2205, 2204, 2202, 2203, 2201) are shown as clear circles, and the POIs that satisfy the search criteria are shown as highlighted filled circles (2209, 2210, 2207, 2208). The search results are then indexed and displayed as previously described, according to user indexing preferences.

The 'Aggregate Average Population Rating Search' is similar to the 'Best Categorical Rating Search', except that the end-category is not defined. This implies that sub-categories beneath the main top-level category, such as restaurants, need not be defined or selected. For the example of restaurant categories, a user would not need to specify what type of cuisine (i.e. Italian, American, etc.) the restaurant should serve. The search process is similar to that of the 'Best Categorical Rating Search', as illustrated in FIG. 15, except that a user would choose only a main category. In one embodiment, the user would search for the best restaurant in a given area based on various preferred quality factors, such as price, and not based on restaurant sub-categories.

Figure 16:
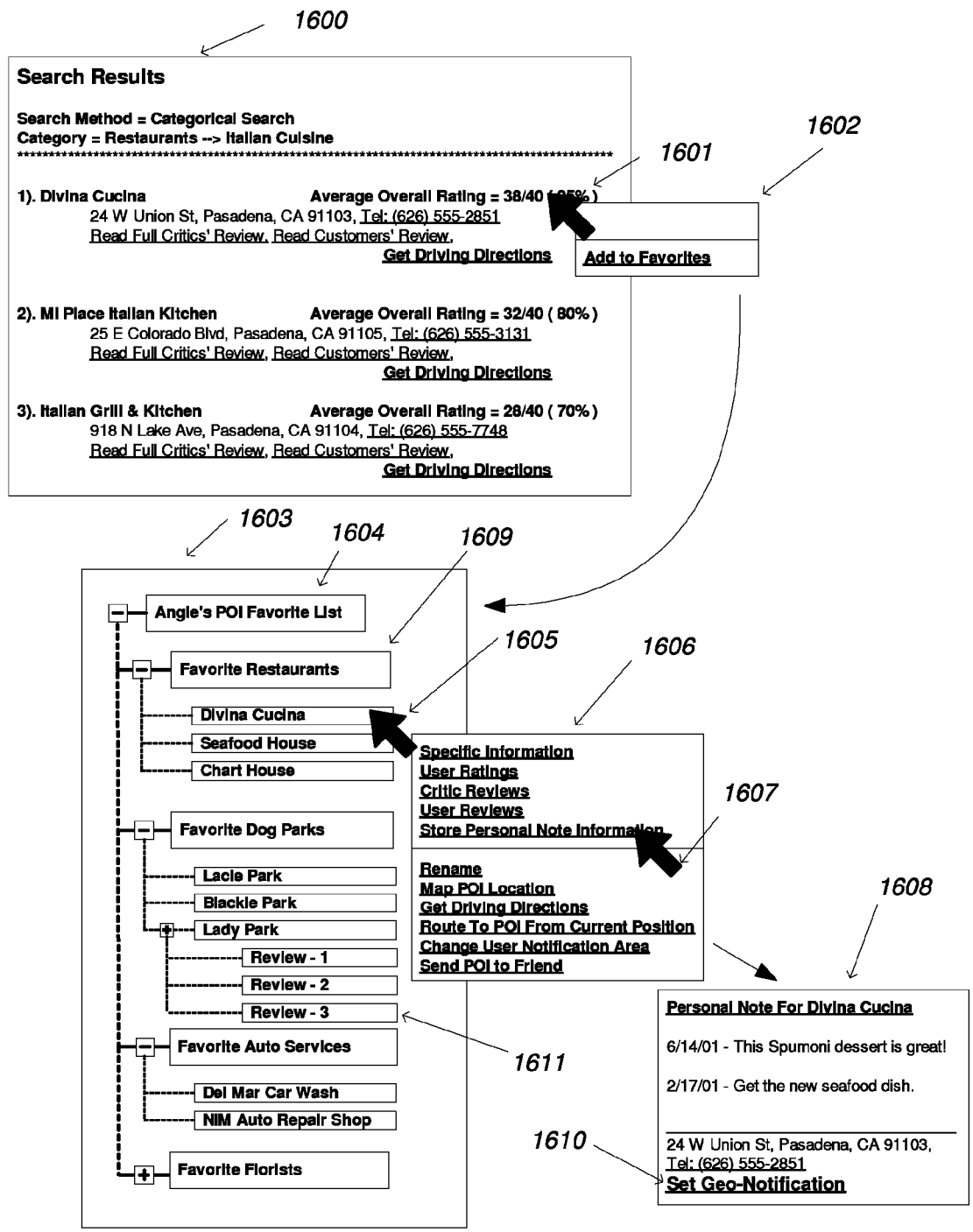
FIG. 16 illustrates a typical 'Personal—Favorites Rating Search' display method for saving POI favorite information in accordance with an embodiment of the present invention.

The 'Personal—Favorites Rating Search' allows users search within their customized POI favorites list using the various other search methods, such as the 'Aggregate Average Population Rating Search'. Users can save various favorite POIs into various customized personal categories, or all grouped together, depending on the user's preferences. This search allows users to compile and store their own personal ratings for various POIs in various user-defined formats, such as personalized folders, which can be stored locally on the mobile device and/or remotely on the online networked rating search engine server. This enables a user to use his/her preferences both locally and remotely, such as when on travel. As with any POI search or identification, once a POI has been identified, its information can be saved for later use. FIG. 16 illustrates a search result utilizing a categorical search, such as the 'Best Categorical Rating Search' method. For this search, 3 restaurant POIs have been returned 1600. The user then selects, such as using an icon pointer 1601, the preferred POI for storage, either locally or on the networked server. By selecting the desired POI a window appears 1602 next to the icon pointer 1601. The window illustrates the option to add the POI to the user's favorite list. If selected 1602, a new window appears 1603, where the user can create, rename, drag and move the POI to a newly created folder 1609, by using the icon pointer 1605. In one embodiment, as illustrated in FIG. 16, the user has 4 folders in her POI Favorite List: 1). Favorite Restaurants, 2), Favorite Dog Parks, 3). Favorite Auto Services, 4). Favorite Florists. These names are preferably customizable, and can be modified to any name at anytime.

Since the new favorite POI, named 'Divina Cucina', has been added to the favorite list 1604 under the Favorite Restaurant folder, the user is able to get, using the icon pointer 1605, various information about a specific POI as shown in FIG. 16. This information 1606 includes various additional fields, such as 1). Specific Information (e.g., address, contact, etc.,), 2). User Ratings, and 3). Critic Reviews, and various additional options, such as 4). Rename (i.e., rename POI field for a more personal label), 5). Map POI Location, 6). Route To POI From Current Location, 7). Store Personal Note Information, 8). Change User Notification Area, and 9). Send POI to Friend, among other possibilities. If the user selects with the icon pointer 1607 the 'Store Personal Note Information' field, for instance, a new window 1608 will appear that identifies specific note information for the POI. In one embodiment, this information includes notes about the restaurant, such as the name of a particular dessert that was enjoyable, and it may include any information about the specific POI. Additionally, this note has a field called 'Set Geo-Notification' 1610, which allows the user to set the boundary or radius of an area in which to alert the user that they are near that specific POI.

Additionally, with any search a user can add reviews, such as personal, critic's, or other users' reviews to their personal storage area, either locally or on the network server, for retrieval at any time. FIG. 16 illustrates that 'Lady (Dog) Park' has 3 user reviews 1611 that have been added to the user's Favorites. This allows users to conveniently retrieve the most important reviews about various POIs that they feel are applicable, thus reducing a time to initiate a new search.

The 'Similar User Rating Search' allows users to use their own preferred POI information, compiled and correlated with the complete user-rating database, to search for the best match of unfamiliar POIs that the user would most probably prefer. In one embodiment, the search method is similar to the other search methods, except that a user is searching for unknown POIs that the user would, with a strong likelihood, prefer, in which the search is based on their previous rated or favorite POIs. The efficacy of this search increases as the number of personally-rated POIs increases, such that having 10 or more previously-rated POIs per category will aid in this search method, but having only 1 or more previously-rated POIs is preferably required for this search method.

Figure 17:
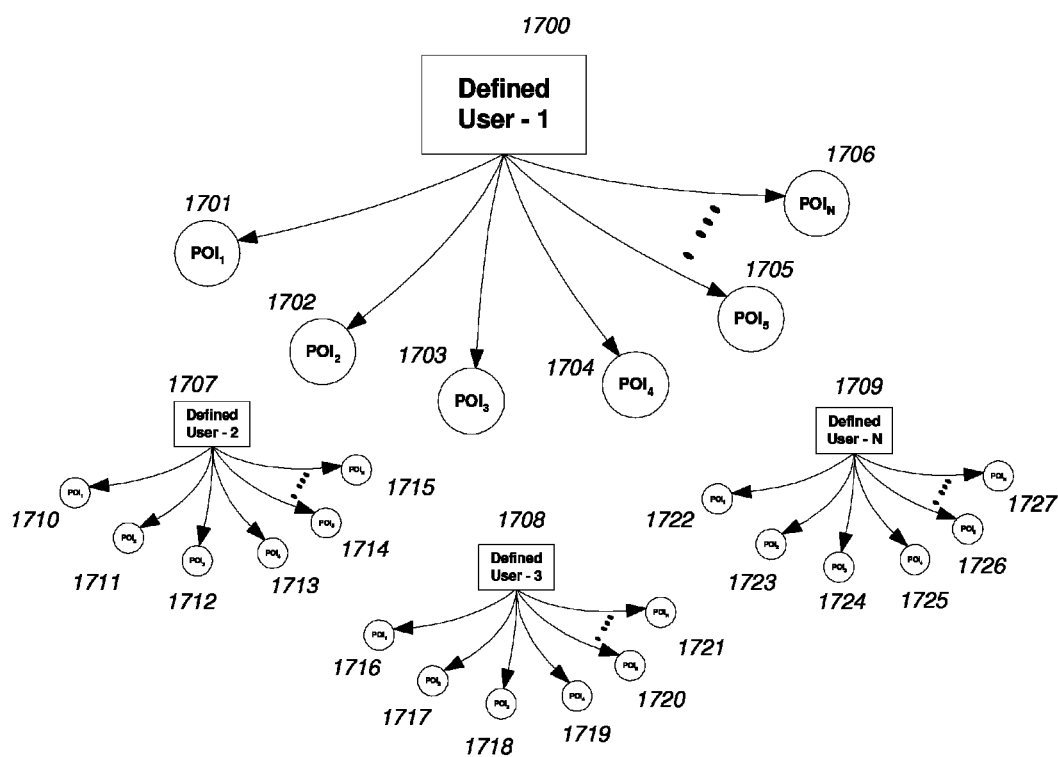
FIG. 17 illustrates a process for determining a 'Similar User Rating Search' match in accordance with another embodiment of the present invention.

As illustrated in FIG. 17, every distinct POI has various information associated with it, as shown in line 17.1, that may include, for example, latitude and longitude values (altitude value can be stored but is not necessary), the POI name, and various categories with their associated ratings. For instance, a restaurant such as the Chart House would have a category of restaurant where a rating value is not necessary so it shall be defined as NULL. Additionally, the Chart House restaurant would also have a category of Seafood, with a rating as NULL. The other category of décor would have an overall rating of 32 out of 40. All categories, such as décor, have pointers to all the users that have rated the category, so that for this example, décor for the Chart House may have 12,748 users that have rated such a category, with an average score of 32, which is displayed in this particular filed in line 17.2 of FIG. 17. All known associated categories to the ChartHouse are implemented in this fashion in an active database. Lines 17.2 and 17.3 of FIG. 17 illustrate that every category can be defined as a sub-category, such as average food entrée cost.

For instance, in Line 17.3 of FIG. 17, one category identifies that a particular POI is defined as a chain or franchise. Other categories, as shown in Lines 17.4 and 17.5 illustrate that a category can also be defined as a restaurant of Italian cuisine, or a restaurant of fast food, that is typically for children, such as a particular McDonalds that has an playground area. This illustrates that a category can be defined as anything to provide more information about a specific POI, thus providing more granularity for the various searches. All categories have an average user rating associated with it. In the case where a rating is not valid, a rating of NULL is used. Additionally, all rating categories have pointers to all the users that have rated such a category. This category schema applies for all searches.

Every user that uses the search system, such as 'User-1' 1700, as shown in FIG. 17, is identified by the authorization and authentication procedures. When users identify POIs as favorites or rate them, the system stores this information for use in various future searches. So every POI that a user rates, including all category information, is stored and associated (i.e., 1701 & 1702 & 1703 & 1704 & 1705 & 1706) with each user. This also includes all POIs that a user saves as a favorite POI. This same method applies for all users in the system 1707 & 1708 & 1709. When users want to find any POI in a given area under any given category, such as 'Seafood Restaurants' they can do an indexed search, similar to FIG. 10 and FIG. 12, except that the results will return the best matching POIs that the user would most probably prefer based on various information that the search system has on record. In one embodiment, when searching for a hotel in any given area, the system would search for various POIs 1701 & 1702 & 1703 & 1704 & 1705 & 1706 associated with the searcher 'User-1' 1700 on file, and correlate them with all other users on file 1707 & 1708 & 1709, and all the POI information about them 1710-1715 & 1716-1721 & 1722-1727. The search engine would then preferably find the users that most closely resemble the searcher's 1700 preferences and base the search on those users' locally preferred POIs under the searched category. Using the other users' 1709 & 1708 ratings for POIs that the searcher 1700 is categorically looking for in a given area, the search method would then return, with the highest probability, the POIs 1716 & 1722 that the searcher would most likely prefer, based on the fact that similar users in the area prefer those POIs.

Figure 18:
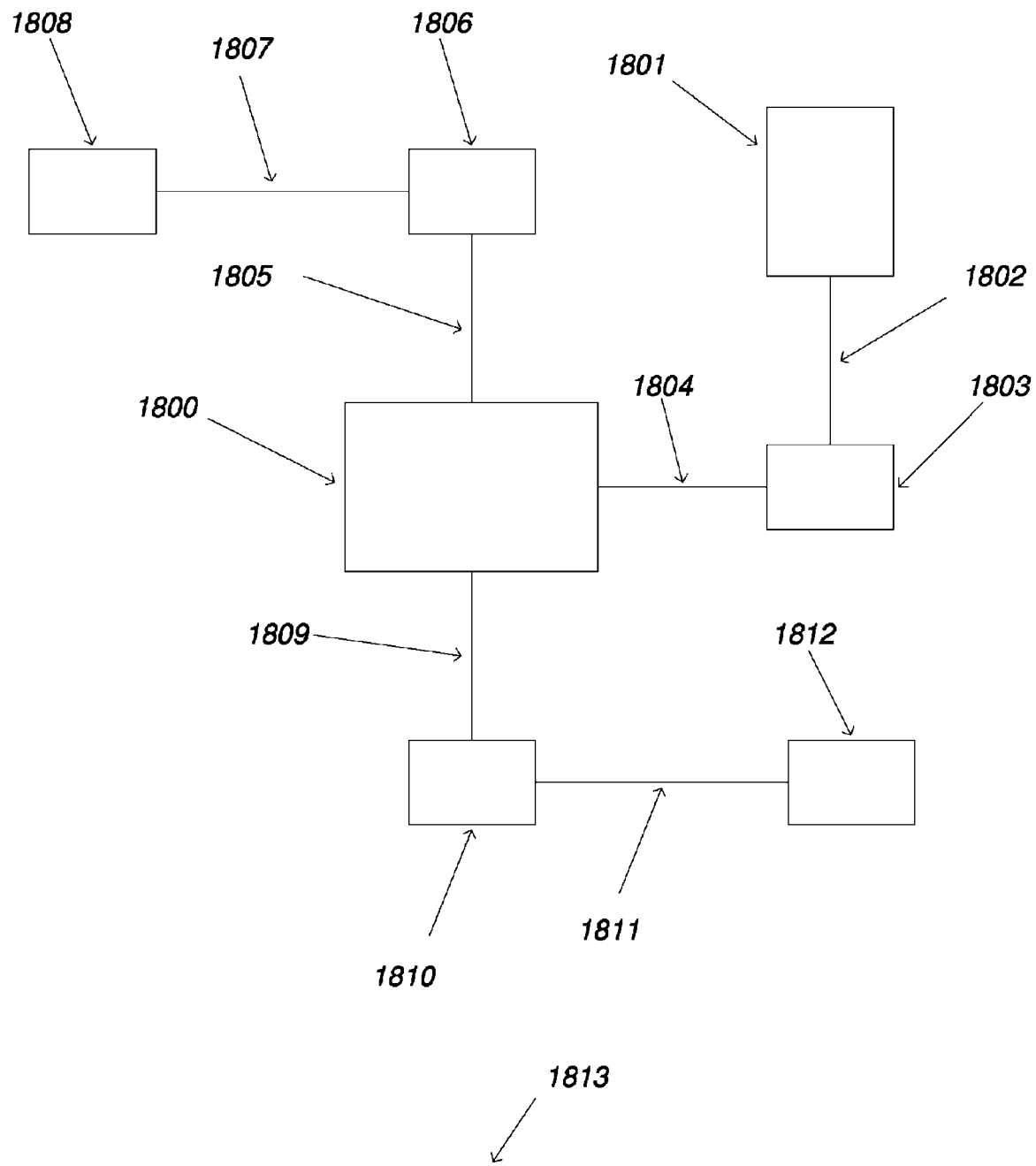
FIG. 18 illustrates a system and method for utilizing POI note information in accordance with another embodiment of the present invention.

The present invention allows users to store personal note information about any POI, such as a franchise or chain, for their review anytime. A user can update this note information by means of any computing device, such as a personal computer, and it is not limited to only navigational devices. The note information can be stored locally on the device or uploaded and stored on the network for retrieval from any location and on any device. As illustrated in FIG. 18, various mobile devices 1808, including navigational devices 101, can store POI note information locally on the device on a storage system (i.e., typically memory or a hard disk). Additionally, this POI note information can be stored on the database server 1801. A mobile device 1808 connects to the database server 1801 through various connections 1807, such as a wired, wireless, infrared, or a wireless CDPD connection. This connection 1807 is connected to a base station 1806, such as a typical Internet Service Provider (ISP), such as Sprint PCS. The base station 1806 is connected 1805 to the Internet, Intranet, or Extranet 1800, and then connected 1804 to another ISP 1803, such as Earthlink. The ISP 1803 has a connection 1802 to the database server 1801, where the note information can be stored. Additionally, a computing device 1812, such as a personal computer can store, update, or read POI note information by storing the information locally or over the network on the database server 1801. The computing device 1812 is typically connected 1811 to various ISPs, such as Earthlink, over various connections 1811, such as using a Digital Service Line (DSL) connection.

The ISP 1810 preferably has a connection 1809 to the Internet, Intranet, or Extranet 1800 and then is connected 1804 to the ISP 1803 that is connected 1802 to the database server 1801. Therefore, any user can store local POI note information, or, by using a network connection and various protocols, such as TCP/IP or UDP, store, read, or update note information on the database server 1801. The note information for various POIs is defined 1813 as shown in FIG. 18. Note information contains various fields, such as a user ID field associating a note to a particular user, the POI name identification, the coordinate of the POI, and the note information field. The last note field is identified with the NULL character.

Figure 19:
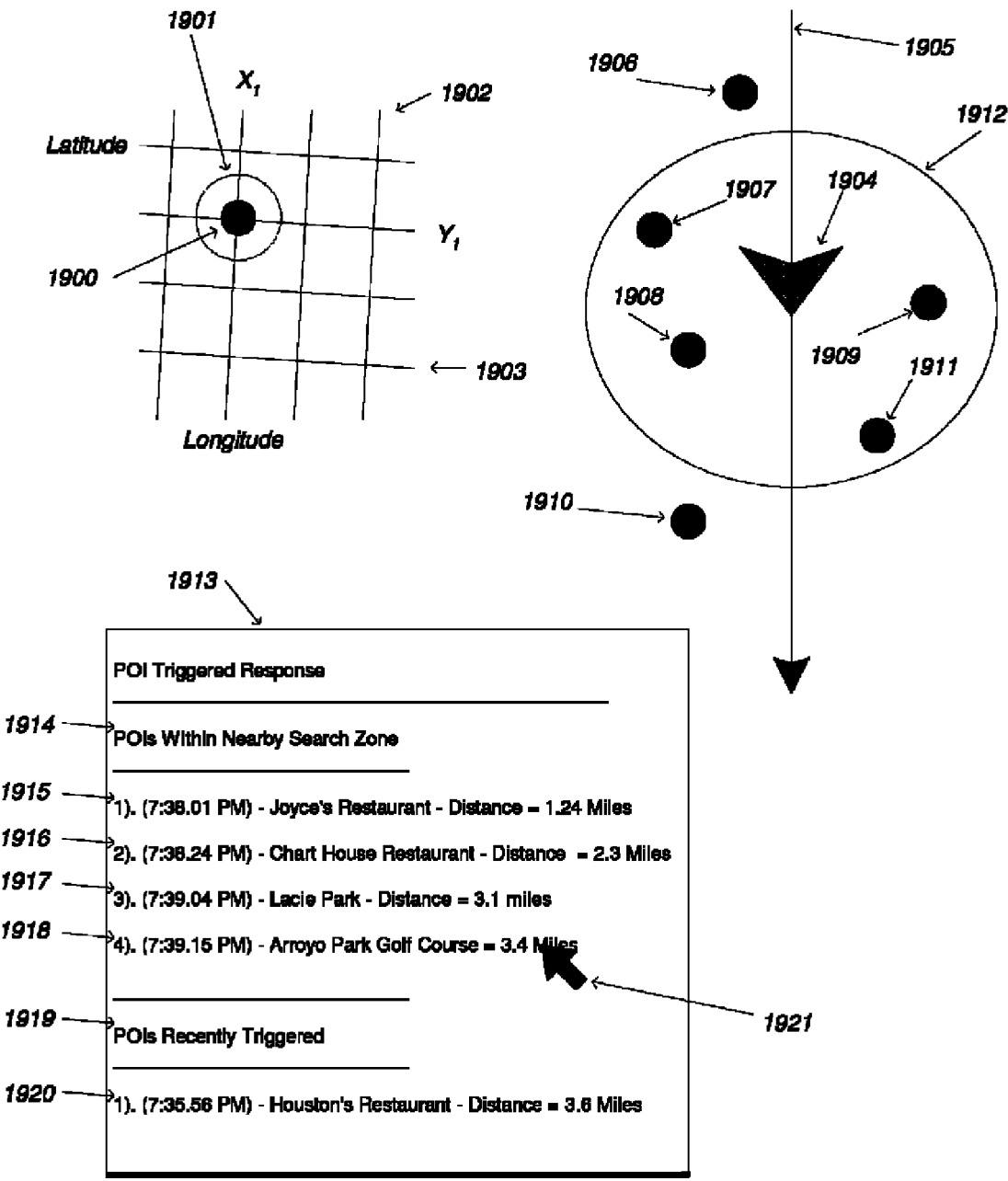
FIG. 19 illustrates a system and method for providing geo-triggered notification to various POIs and users in accordance with another embodiment of the present invention.

Users can be apprised that they are near any POI based on various zone boundaries, such as a radial or box-boundary defined area of either the user or the POI. As illustrated in FIG. 16 any available POI can be saved as a Favorite POI for later use and quick access. Once these POIs have been saved, either locally or on the online network server, they can be accessed by the user or by the system. Every POI 1900, as illustrated in FIG. 19, has associated with it latitude 1903, longitude 1902, and sometimes altitude values. Additionally, every navigational device 1904 can have associated with it latitude, longitude, and altitude values. By defining an area 1901 around a POI, for example, or an area 1912 around a navigational device 1904, it is possible to notify the user of that navigational device that a POI is nearby, or to notify a POI that a user is near the POI. In one embodiment, a navigational device is traveling on any given route 1905 that can change instantaneously in any direction. Surrounding this navigational device 1904, and/or near the route 1905 the device is traveling on, are various POIs 1906 & 1907 & 1908 & 1909 & 1910 & 1911. All of these POIs are known to the user of the navigational device, and have been stored in the user's Favorites directory. Once the navigational device is within a predetermined area or range 1912 of any of the various POIs stored in the user's Favorites directory, a notification response 1913 is provided to the user. For instance, as the navigational device is traveling along any defined or undefined route 1905, when it comes within range 1912 of various favorite POIs 1904 & 1907 & 1908 & 1909 & 1911, a geo-trigger reports the POIs' proximity to the user in various formats, such as a text display 1913 (as shown in FIG. 19), audio, speech, etc. The POIs are displayed in the order of the closest proximity.

For instance, Joyce's Restaurant 1915 is the first POI 1907, still within range 1912, to be triggered and displayed 1913 & 1914, followed by the Chart House 1916 & 1909, Lacie Park 1917 & 1908, and Arroyo Park Golf Course 1918 & 1910. Note that the display 1913 shows a recently triggered POI 1906 in the history list 1919 as Houston's Restaurant 1920. Additionally, each triggered response 1915 & 1916 & 1917 & 1918 & 1920 can be activated by, for instance, an icon pointer 1921 to get additional information about the POI, such as Favorite associated information, driving directions, etc.

Figure 20:
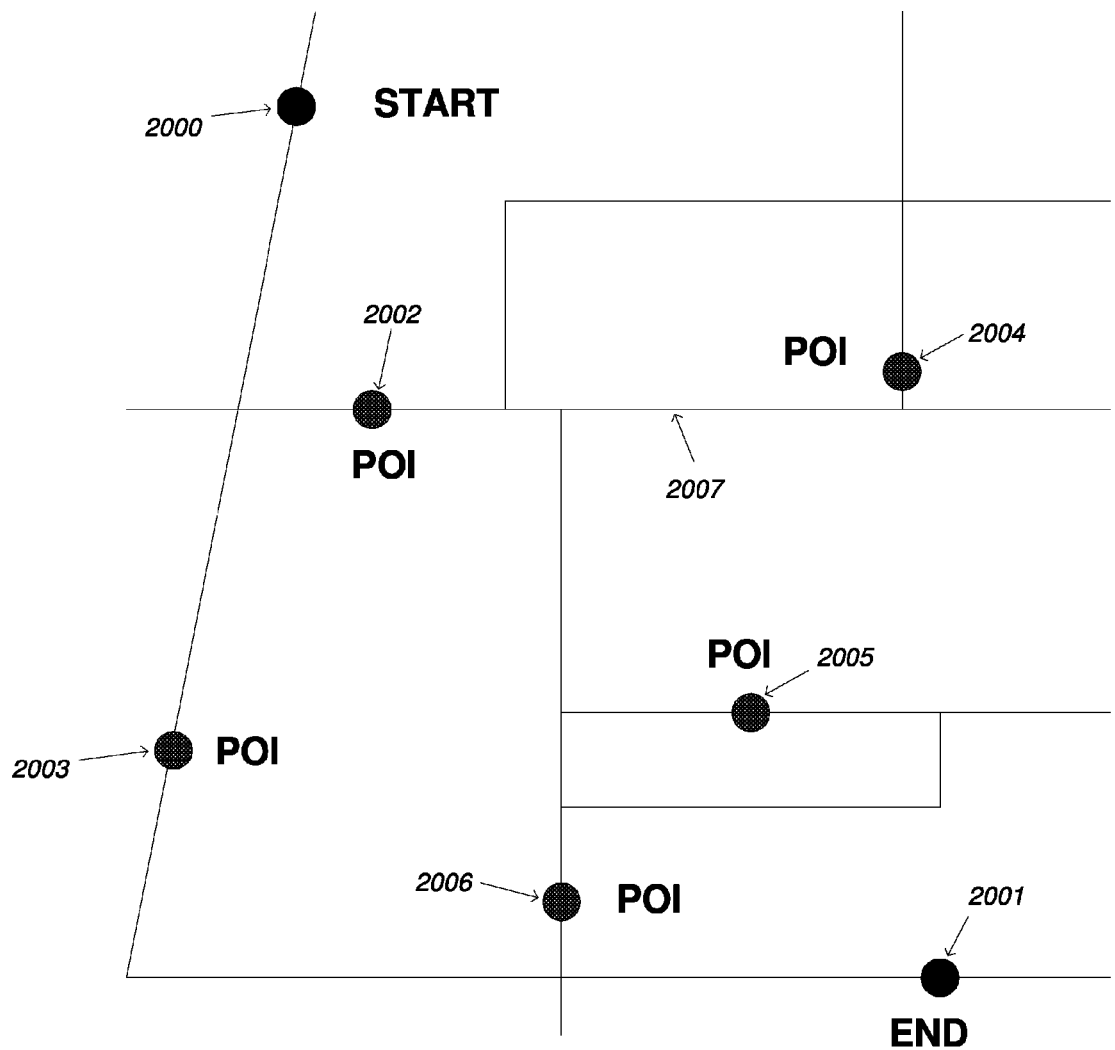
FIG. 20 illustrates a mechanism for defining various POIs to be incorporated in a route.
Figure 21:
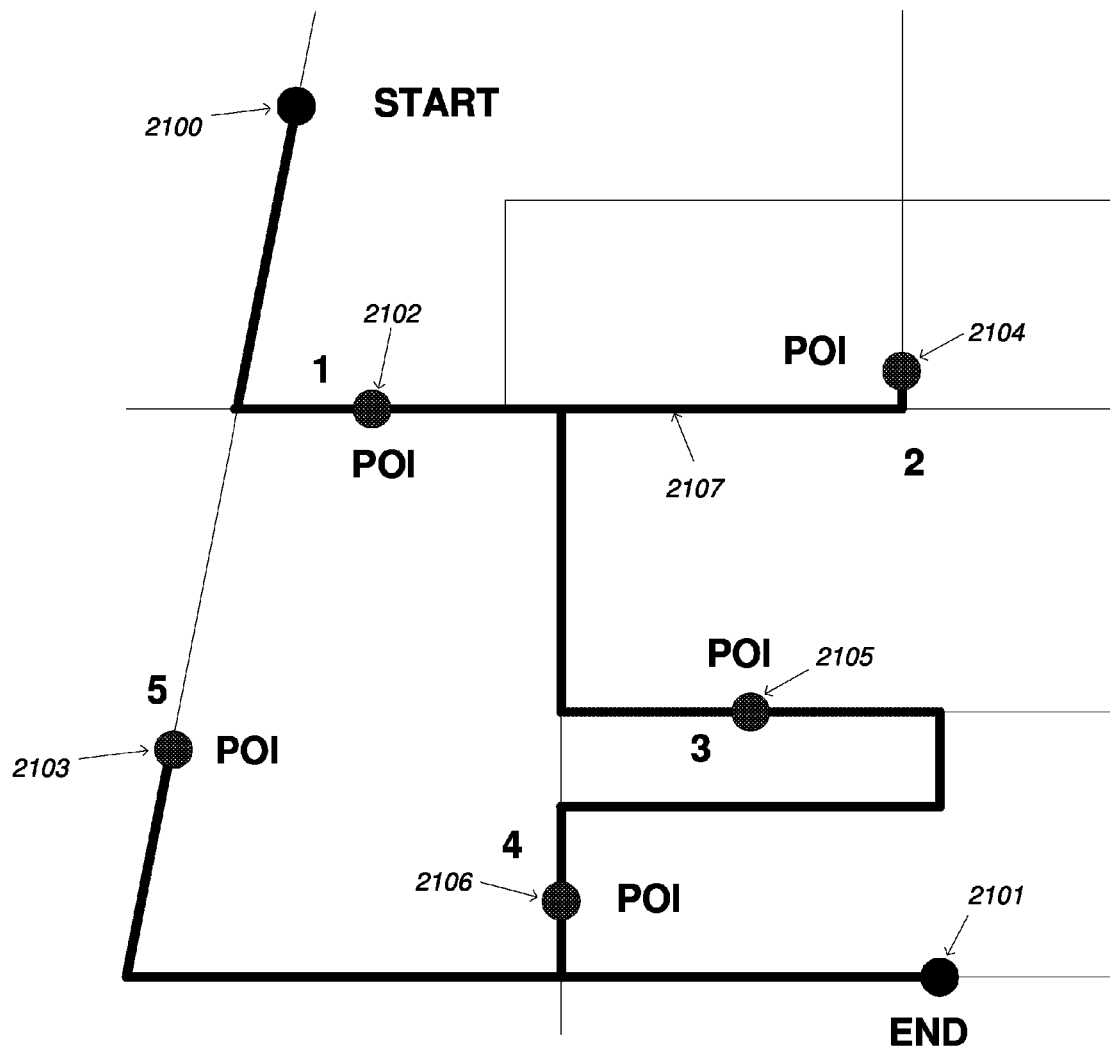
FIG. 21 illustrates the optimal route information for traveling to various POIs with a route with defined origin and destination.

For any given POI, as chosen in a variety of methods including the various aforementioned search methods, a user can create an optimal route based on POI location or POI location and order. In one embodiment, a user can select various POIs, such as the 'Personal—Favorites Rating Search' provides, to be incorporated into a route (see FIG. 20). A user defines START 2000 and END 2001 locations, typically on a map of varying resolution or size or by entering address information, or the like. After a user has chosen various POIs 2002 & 2003 & 2004 & 2005 & 2006, the user allows the system to calculate the preferred route 2107, typically on a street or road network 2007, based on various factors, such as traffic information, speed limits, turn restrictions, etc., and based on user preferences, such as preferred streets or highways to use or avoid, while incorporating the selected POIs as stopover points along the route. The system can also calculate the preferred route 2107 information based on a desired POI stopover route order, such that the first POI 2002 is reached before the second POI 2004, and so on. As shown in FIG. 21, the system calculates and displays the optimal route 2107 directions and numbered order. For this case, since the POI stopover route order parameter was unspecified, the system calculated the route's POI stopover order, which in this case, is as shown in FIG. 21: 1). 2102, 2). 2104, 3). 2105, 4). 2106, and 5). 2103, where the START 2100 and END 2101 locations are unchanged. If the POI stopover route 2107 order were specified, the system would calculate the best route given those constraints. Additionally, the route 2107 information can be displayed in a similar fashion as illustrated in FIG. 11.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A method of using a mobile device to retrieve information associated to a point of interest, said mobile device having a GPS receiver, a computer-readable memory, a user input, and a display, said method comprising the steps of:
receiving, via the GPS receiver, a real-time position information of the mobile device, said real-time position information indicating a real-time location of the mobile device;
receiving a search request, the search request requesting a search for a point of interest;
in response to the search request, performing a search for the point of interest using a plurality of search methods, wherein at least one of the search method is based on distance of the points of interests from the real-time location of the mobile device, and wherein each of the plurality of search methods provide a unique search result;
combining the search results of the plurality of search methods to generate at least one recommended point of interest; and
presenting information associated with the at least one recommended point of interest.

2. The method of claim 1, wherein said step of combining includes the step of assigning a weighing value to each of the plurality of search results.

3. The method of claim 1, wherein said plurality of search methods further include at least one of a critic rating search method, an aggregate user rating search method, a personal favorite rating search method, and a similar user ratings search method.

4. The method of claim 1, wherein the information associated with the at least one recommended point of interest includes the address information of the at least one recommended point of interest.

5. The method of claim 1, further comprising a step of displaying rating information for the at least one recommended point of interest.

6. The method of claim 1, further comprising the steps of:
retrieving route information for traveling between the real-time location of the mobile device to the location of the at least one recommended point of interest; and
presenting the route information on the mobile device display.

7. The method of claim 6, wherein the route information presented includes graphical map information.

8. The method of claim 1, further comprising a step of saving to the computer-readable memory of the mobile device the name and address information of the at least one recommended point of interest.

9. A computer-readable medium encoded with a computer program for performing a method of using a mobile device to retrieve information associated to a point of interest, said mobile device having a GPS receiver, a user input, and a display, said method comprising the steps of:
receiving, via the GPS receiver, a real-time position information of the mobile device, said real-time position information indicating a real-time location of the mobile device;
receiving a search request, the search request requesting a search for a point of interest;
in response to the search request, performing a search for the point of interest using a plurality of search methods, wherein at least one of the search method is based on distance of the points of interests from the real-time location of the mobile device, and wherein each of the plurality of search methods provide a unique search result;
combining the search results of the plurality of search methods to generate at least one recommended point of interest; and
presenting information associated with the at least one recommended point of interest.

10. The computer-readable medium of claim 9, wherein said step of combining includes the step of assigning a weighing value to each of the plurality of search results.

11. The computer-readable medium of claim 9, wherein said plurality of search methods further include at least one of a critic rating search method, an aggregate user rating search method, a personal favorite rating search method, and a similar user ratings search method.

12. The computer-readable medium of claim 9, wherein the information associated with the at least one recommended point of interest includes the address information of the at least one recommended point of interest.

13. The computer-readable medium of claim 9, wherein the method further comprises a step of displaying rating information for the at least one recommended point of interest.

14. The computer-readable medium of claim 9, wherein the method further comprises the steps of:
retrieving route information for traveling between the real-time location of the mobile device to the location of the at least one recommended point of interest; and
presenting the route information on the mobile device display.

15. The computer-readable medium of claim 14, wherein the route information presented includes graphical map information.

16. The computer-readable medium of claim 9, wherein the method further comprises a step of saving to the computer-readable medium the name and address information of the at least one recommended point of interest.

17. A method for colleting rating information for a point of interest using a mobile device, said mobile device including a GPS receiver, a user input, a display, and a computer-readable medium, said method comprising the steps of:
receiving, via the GPS receiver, a real-time position information of the mobile device, said real-time information indicating a real-time location of the mobile device;
determining whether the real-time location of the mobile device is within a predetermined distance from a point of interest;
upon determining the mobile device is within the predetermined distance from the point of interest, displaying, on the display, information associated with the point of interest; and
receiving, from the user input, rating information for the point of interest.

18. The method of claim 17, further comprising a step of sending, to a network server, the received rating information for the point of interest.

19. The method of claim 17, further comprising a step of saving, to the computer-readable medium, the received rating information about the point of interest.

20. The method of claim 17, further comprising the steps of:
retrieving route information between the real-time location of the mobile device and the point of interest; and
presenting, on the display, the route information.

21. The method of claim 17, further comprising a step of receiving, from the user input, personal note information about the point of interest.

22. The method of claim 17, further comprising the steps of:
- determining whether the computer-readable medium contains previously received rating information for the point of interest; and
- if it is determined the computer-readable medium contains previously received rating information, updating the previously received rating information with the received rating information for the point of interest.

23. The method of claim 17, further comprising the steps of:
- receiving, from the user input, sign-in information for a user; and
- authenticating the sign-in information of the user.

24. A computer-readable medium encoded with a computer program for performing a method of colleting rating information for a point of interest using a mobile device, said mobile device including a GPS receiver, a user input, and a display, said method comprising the steps of:
- receiving, via the GPS receiver, a real-time position information of the mobile device, said real-time information indicating a real-time location of the mobile device;
- determining whether the real-time location of the mobile device is within a predetermined distance from a point of interest;
- upon determining the mobile device is within the predetermined distance from the point of interest, displaying, on the display, information associated with the point of interest; and
- receiving, from the user input, rating information for the point of interest.

25. The computer-readable medium of claim 24, wherein the method further comprises a step of sending, to a network server, the received rating information for the point of interest.

26. The computer-readable medium of claim 24, wherein the method further comprises a step of saving, to the computer-readable medium, the received rating information about the point of interest.

27. The computer-readable medium of claim 17, wherein the method further comprises the steps of:
- retrieving route information between the real-time location of the mobile device and the point of interest; and
- presenting, on the display, the route information.

28. The computer-readable medium of claim 24, wherein the method further comprises a step of receiving, from the user input, personal note information about the point of interest.

29. The computer-readable medium of claim 24, wherein the method further comprises the steps of:
- determining whether the computer-readable medium contains previously received rating information for the point of interest; and
- if it is determined the computer-readable medium contains previously received rating information, updating the previously received rating information with the received rating information for the point of interest.

30. The computer-readable medium of claim 24, wherein the method further comprises the steps of:
- receiving, from the user input, sign-in information for a user; and
- authenticating the sign-in information of the user.

31. A method for displaying location-triggered information using a mobile device using, said mobile device including a GPS receiver, a user input, a display, and a computer-readable medium, said method comprising the steps of:
- receiving, via the GPS receiver, a real-time position information of the mobile device, said real-time position information indicating a real-time location of the mobile device;
- determining whether the real-time location of the mobile device is within a predetermined distance from a point of interest;
- determining whether the point of interest is on a current route of travel by the mobile device; and
- if it is determined that the real-time location of the mobile device is within a predetermined distance from the point of interest and that the point of interest is on a current route of travel by the mobile device, automatically displaying information associated with the point of interest.

32. The method of claim 31, wherein the automatically displayed information is one of a rating information and a discount coupon associated with the point of interest.

33. The method of claim 32, wherein the rating information is one of personal rating information, similar user rating information, critic review rating information, and aggregate user rating information.

34. The method of claim 31, further comprising the steps of:
- retrieving route information for traveling between the real-time location of the mobile device and the point of interest; and
- displaying, on the display, the route information.

35. The method of claim 31, further comprising a step of displaying the address information of the point of interest.

36. A computer-readable medium encoded with a computer program for performing a method of displaying location-triggered information using a mobile device using, said mobile device including a GPS receiver, a user input, and a display, said method comprising the steps of:
- receiving, via the GPS receiver, a real-time position information of the mobile device, said real-time position information indicating a real-time location of the mobile device;
- determining whether the real-time location of the mobile device is within a predetermined distance from a point of interest;
- determining whether the point of interest is on a current route of travel by the mobile device; and
- if it is determined that the real-time location of the mobile device is within a predetermined distance from the point of interest and that the point of interest is on a current route of travel by the mobile device, automatically displaying information associated with the point of interest.

37. The computer-readable medium of claim 36, wherein the automatically displayed information is one of a rating information and a discount coupon associated with the point of interest.

38. The computer-readable medium of claim 37, wherein the rating information is one of personal rating information, similar user rating information, critic review rating information, and aggregate user rating information.

39. The computer-readable medium of claim 36, wherein the method further comprises the steps of:
- retrieving route information for traveling between the real-time location of the mobile device and the point of interest; and
- displaying, on the display, the route information.

40. The computer-readable medium of claim 36, wherein the method further comprises a step of displaying the address information of the point of interest.

* * * * *